(12) United States Patent
Marcouiller et al.

(10) Patent No.: US 8,885,998 B2
(45) Date of Patent: Nov. 11, 2014

(54) SPLICE ENCLOSURE ARRANGEMENT FOR FIBER OPTIC CABLES

(75) Inventors: Thomas Marcouiller, Shakopee, MN (US); Paula Rudenick, Eden Prairie, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 262 days.

(21) Appl. No.: 13/315,570

(22) Filed: Dec. 9, 2011

(65) Prior Publication Data

US 2012/0177328 A1 Jul. 12, 2012

Related U.S. Application Data

(60) Provisional application No. 61/421,314, filed on Dec. 9, 2010.

(51) Int. Cl.
G02B 6/44 (2006.01)
G02B 6/255 (2006.01)

(52) U.S. Cl.
CPC ............ *G02B 6/4471* (2013.01); *G02B 6/4477* (2013.01); *G02B 6/2558* (2013.01)
USPC .............. 385/100; 385/99; 385/134; 385/135

(58) Field of Classification Search
None
See application file for complete search history.

(56) References Cited

U.S. PATENT DOCUMENTS

| | | |
|---|---|---|
| 2,047,152 A | 7/1936 | Mitchell |
| 3,441,659 A | 4/1969 | Laudig et al. |
| 3,691,505 A | 9/1972 | Graves |
| 3,845,552 A | 11/1974 | Waltz |
| 3,879,575 A | 4/1975 | Dobbin et al. |
| 3,912,854 A | 10/1975 | Thompson et al. |
| 3,912,855 A | 10/1975 | Thompson et al. |
| 3,991,014 A | 11/1976 | Kleinschuster |
| 4,067,852 A | 1/1978 | Calundann |
| 4,078,853 A | 3/1978 | Kempf et al. |
| 4,083,829 A | 4/1978 | Calundann et al. |
| 4,085,286 A | 4/1978 | Horsma et al. |
| 4,089,585 A | 5/1978 | Slaughter et al. |
| 4,107,451 A | 8/1978 | Smith, Jr. et al. |

(Continued)

FOREIGN PATENT DOCUMENTS

| | | |
|---|---|---|
| DE | 25 13 723 A1 | 10/1976 |
| DE | 35 37 684 A1 | 4/1987 |

(Continued)

OTHER PUBLICATIONS

"Cable Assemblies: Molding & Termination," http://www.dgo.com/prodcable.htm, 8 pages (Copyright 2001).

(Continued)

*Primary Examiner* — Mike Stahl
(74) *Attorney, Agent, or Firm* — Merchant & Gould P.C.

(57) ABSTRACT

An optical fiber cable includes a first cable segment; a second cable segment; and a splice enclosure. The first cable segment can have a different configuration than the second cable segment. The splice enclosure is coupled to the strength member and strength component of the first cable segment and the second cable segment. One example splice enclosure includes a first enclosure member and a second enclosure member. The strength component can be glued to one end of the splice enclosure and the strength member can be clamped or otherwise retained by another end of the splice enclosure.

20 Claims, 17 Drawing Sheets

(56) References Cited

U.S. PATENT DOCUMENTS

| | | |
|---|---|---|
| 4,130,545 A | 12/1978 | Calundann |
| 4,152,539 A | 5/1979 | Charlebois et al. |
| 4,161,470 A | 7/1979 | Calundann |
| 4,196,965 A | 4/1980 | Matsuno |
| 4,199,225 A | 4/1980 | Slaughter et al. |
| 4,304,462 A | 12/1981 | Baba et al. |
| 4,318,842 A | 3/1982 | East et al. |
| 4,322,573 A | 3/1982 | Charlebois |
| 4,343,844 A | 8/1982 | Thayer et al. |
| 4,348,076 A * | 9/1982 | Oldham .................. 385/69 |
| 4,359,598 A | 11/1982 | Dey et al. |
| 4,401,361 A | 8/1983 | Slaughter |
| 4,405,083 A | 9/1983 | Charlebois et al. |
| 4,413,881 A | 11/1983 | Kovats |
| 4,420,220 A | 12/1983 | Dean et al. |
| 4,460,735 A | 7/1984 | Froix |
| 4,467,137 A | 8/1984 | Jonathan et al. |
| 4,468,364 A | 8/1984 | Ide |
| 4,475,935 A | 10/1984 | Tanaka et al. |
| 4,481,380 A | 11/1984 | Wood et al. |
| 4,490,315 A | 12/1984 | Charlebois et al. |
| 4,512,628 A | 4/1985 | Anderton |
| 4,515,435 A | 5/1985 | Anderson |
| 4,528,150 A | 7/1985 | Charlebois et al. |
| 4,528,419 A | 7/1985 | Charlebois et al. |
| 4,549,039 A | 10/1985 | Charlebois et al. |
| 4,550,220 A | 10/1985 | Kitchens |
| 4,550,976 A | 11/1985 | Cooper et al. |
| 4,553,815 A | 11/1985 | Martin |
| 4,556,281 A | 12/1985 | Anderton |
| 4,569,420 A | 2/1986 | Pickett et al. |
| 4,570,032 A | 2/1986 | Charlebois et al. |
| 4,581,480 A | 4/1986 | Charlebois |
| 4,589,939 A | 5/1986 | Mohebban et al. |
| 4,591,330 A | 5/1986 | Charlebois et al. |
| 4,592,721 A | 6/1986 | Charlebois et al. |
| 4,595,256 A | 6/1986 | Guazzo |
| 4,609,773 A | 9/1986 | Brown et al. |
| 4,623,495 A | 11/1986 | Degoix et al. |
| 4,625,073 A | 11/1986 | Breesch et al. |
| 4,629,597 A | 12/1986 | Charlebois et al. |
| 4,648,606 A | 3/1987 | Brown et al. |
| 4,648,919 A | 3/1987 | Diaz et al. |
| 4,654,474 A | 3/1987 | Charlebois et al. |
| 4,659,174 A | 4/1987 | Ditscheid et al. |
| 4,666,537 A | 5/1987 | Dienes |
| 4,670,069 A | 6/1987 | Debbaut et al. |
| 4,670,980 A | 6/1987 | Charlebois et al. |
| 4,678,866 A | 7/1987 | Charlebois |
| 4,684,764 A | 8/1987 | Luzzi et al. |
| 4,693,551 A | 9/1987 | Blanco et al. |
| 4,701,574 A | 10/1987 | Shimirak et al. |
| 4,715,677 A | 12/1987 | Saito et al. |
| 4,723,831 A | 2/1988 | Johnson et al. |
| 4,725,035 A | 2/1988 | Charlebois et al. |
| 4,728,698 A | 3/1988 | Isayev et al. |
| 4,729,628 A | 3/1988 | Kraft et al. |
| 4,730,894 A | 3/1988 | Arroyo |
| 4,732,628 A | 3/1988 | Dienes |
| 4,747,020 A | 5/1988 | Brickley et al. |
| 4,761,052 A | 8/1988 | Buekers et al. |
| 4,761,053 A | 8/1988 | Cogelia et al. |
| 4,764,232 A | 8/1988 | Hunter |
| 4,765,712 A | 8/1988 | Bohannon, Jr. et al. |
| 4,767,183 A | 8/1988 | Martin |
| 4,773,728 A | 9/1988 | Kershaw |
| 4,778,244 A | 10/1988 | Ryan |
| 4,781,433 A | 11/1988 | Arroyo et al. |
| 4,798,443 A | 1/1989 | Knipe et al. |
| 4,807,962 A | 2/1989 | Arroyo et al. |
| 4,810,834 A | 3/1989 | Grögl et al. |
| 4,813,754 A * | 3/1989 | Priaroggia .................. 385/69 |
| 4,818,060 A | 4/1989 | Arroyo |
| 4,818,824 A | 4/1989 | Dixit et al. |
| 4,822,434 A | 4/1989 | Sawaki et al. |
| 4,826,278 A | 5/1989 | Gartside, III et al. |
| 4,835,047 A | 5/1989 | Isayev et al. |
| 4,844,575 A | 7/1989 | Kinard et al. |
| 4,852,965 A | 8/1989 | Mullin et al. |
| 4,875,757 A | 10/1989 | Greveling |
| 4,875,952 A | 10/1989 | Mullin et al. |
| 4,884,863 A | 12/1989 | Throckmorton |
| 4,895,427 A | 1/1990 | Kraft |
| 4,906,066 A | 3/1990 | Ryan |
| 4,909,592 A | 3/1990 | Arroyo et al. |
| 4,910,727 A | 3/1990 | Fussganger |
| 4,913,512 A | 4/1990 | Anderton |
| 4,946,249 A | 8/1990 | Barlow et al. |
| 4,950,048 A | 8/1990 | Kakii et al. |
| 4,952,798 A | 8/1990 | Graham et al. |
| 4,956,039 A | 9/1990 | Olesen et al. |
| 4,961,623 A | 10/1990 | Midkiff et al. |
| 4,963,698 A | 10/1990 | Chang et al. |
| RE33,459 E | 11/1990 | Bohannon, Jr. et al. |
| 4,974,925 A * | 12/1990 | Troutman et al. .................. 385/99 |
| 4,982,083 A | 1/1991 | Graham et al. |
| 4,986,762 A | 1/1991 | Keith |
| 5,004,315 A | 4/1991 | Miyazaki |
| 5,006,402 A | 4/1991 | Isayev |
| 5,006,403 A | 4/1991 | Isayev |
| 5,015,063 A | 5/1991 | Panuska et al. |
| 5,021,475 A | 6/1991 | Isayev |
| 5,032,433 A | 7/1991 | Isayev et al. |
| 5,039,456 A | 8/1991 | Bowen et al. |
| 5,042,901 A | 8/1991 | Merriken et al. |
| 5,046,811 A | 9/1991 | Jung et al. |
| 5,050,957 A | 9/1991 | Hamilton et al. |
| 5,054,868 A | 10/1991 | Hoban et al. |
| 5,066,095 A | 11/1991 | Dekeyser et al. |
| 5,070,157 A | 12/1991 | Isayev et al. |
| 5,074,808 A | 12/1991 | Beamenderfer et al. |
| 5,076,688 A | 12/1991 | Bowen et al. |
| 5,082,348 A | 1/1992 | Gartside, III et al. |
| 5,097,529 A | 3/1992 | Cobb et al. |
| 5,098,177 A | 3/1992 | Tanaka |
| 5,099,088 A | 3/1992 | Usami et al. |
| 5,115,105 A | 5/1992 | Gallusser et al. |
| 5,121,244 A | 6/1992 | Takasaki |
| 5,121,458 A | 6/1992 | Nilsson et al. |
| 5,125,060 A | 6/1992 | Edmundson |
| 5,125,063 A | 6/1992 | Panuska et al. |
| 5,148,509 A | 9/1992 | Kannabiran |
| 5,157,752 A | 10/1992 | Greveling et al. |
| 5,185,844 A | 2/1993 | Bensel, III et al. |
| 5,194,692 A | 3/1993 | Gallusser et al. |
| 5,210,812 A | 5/1993 | Nilsson et al. |
| 5,214,730 A | 5/1993 | Nagasawa et al. |
| 5,217,808 A | 6/1993 | Cobb |
| 5,222,176 A | 6/1993 | Webber et al. |
| 5,224,187 A * | 6/1993 | Davisdon .................. 385/87 |
| 5,229,851 A | 7/1993 | Rahman |
| 5,238,638 A | 8/1993 | Isayev |
| 5,241,611 A | 8/1993 | Gould |
| 5,245,151 A | 9/1993 | Chamberlain et al. |
| 5,260,380 A | 11/1993 | Isayev |
| 5,268,225 A | 12/1993 | Isayev |
| 5,275,877 A | 1/1994 | Isayev |
| 5,307,843 A | 5/1994 | Jarrin et al. |
| 5,320,788 A | 6/1994 | Schneider et al. |
| 5,335,408 A | 8/1994 | Cobb |
| 5,345,525 A | 9/1994 | Holman et al. |
| 5,345,526 A | 9/1994 | Blew |
| 5,347,089 A | 9/1994 | Barrat et al. |
| 5,353,367 A | 10/1994 | Czosnowski et al. |
| 5,360,497 A | 11/1994 | Schneider et al. |
| 5,367,159 A | 11/1994 | Schofield et al. |
| 5,367,593 A | 11/1994 | Lebby et al. |
| 5,376,196 A | 12/1994 | Grajewski et al. |
| 5,378,853 A | 1/1995 | Clouet et al. |
| 5,394,502 A | 2/1995 | Caron |
| 5,402,515 A | 3/1995 | Vidacovich et al. |
| 5,410,105 A | 4/1995 | Tahara et al. |
| RE34,955 E | 5/1995 | Anton et al. |
| 5,420,958 A | 5/1995 | Henson et al. |

(56) References Cited

U.S. PATENT DOCUMENTS

| | | |
|---|---|---|
| 5,440,655 A | 8/1995 | Kaplow et al. |
| 5,440,665 A | 8/1995 | Ray et al. |
| 5,442,726 A | 8/1995 | Howard et al. |
| 5,448,670 A | 9/1995 | Blew et al. |
| 5,450,517 A | 9/1995 | Essert |
| 5,475,781 A | 12/1995 | Chang et al. |
| 5,491,766 A | 2/1996 | Huynh et al. |
| 5,509,097 A | 4/1996 | Tondi-Resta et al. |
| 5,509,202 A | 4/1996 | Abdow |
| 5,517,592 A | 5/1996 | Grajewski et al. |
| 5,528,718 A | 6/1996 | Ray et al. |
| 5,557,698 A | 9/1996 | Gareis et al. |
| 5,561,729 A | 10/1996 | Parris |
| 5,596,662 A | 1/1997 | Boscher |
| 5,627,932 A | 5/1997 | Kiel et al. |
| 5,657,413 A | 8/1997 | Ray et al. |
| 5,666,453 A | 9/1997 | Dannenmann |
| 5,680,234 A | 10/1997 | Darcie et al. |
| 5,684,911 A | 11/1997 | Burgett |
| 5,696,864 A | 12/1997 | Smith et al. |
| 5,708,753 A | 1/1998 | Frigo et al. |
| 5,727,100 A | 3/1998 | Grajewski et al. |
| 5,734,776 A | 3/1998 | Puetz |
| 5,737,470 A | 4/1998 | Nagano et al. |
| 5,748,819 A | 5/1998 | Szentesi et al. |
| 5,757,997 A | 5/1998 | Birrell et al. |
| 5,767,198 A | 6/1998 | Shimizu et al. |
| 5,767,448 A | 6/1998 | Dong |
| 5,778,122 A | 7/1998 | Giebel et al. |
| 5,790,285 A | 8/1998 | Mock |
| 5,802,231 A | 9/1998 | Nagano et al. |
| 5,823,646 A | 10/1998 | Arizpe et al. |
| 5,825,963 A | 10/1998 | Burgett |
| 5,838,864 A | 11/1998 | Patel et al. |
| 5,861,575 A | 1/1999 | Broussard |
| 5,892,870 A | 4/1999 | Fingler et al. |
| 5,894,536 A | 4/1999 | Rifkin et al. |
| 5,898,808 A | 4/1999 | Morlion et al. |
| 5,898,813 A | 4/1999 | Beier |
| 5,907,417 A | 5/1999 | Darcie et al. |
| 5,945,633 A | 8/1999 | Ott et al. |
| 5,969,294 A | 10/1999 | Eberle et al. |
| 5,970,192 A | 10/1999 | Osugi et al. |
| 5,970,196 A | 10/1999 | Greveling et al. |
| 5,978,536 A | 11/1999 | Brandi et al. |
| 5,982,966 A | 11/1999 | Bonicel |
| 5,997,186 A | 12/1999 | Huynh et al. |
| 6,014,487 A | 1/2000 | Field et al. |
| RE36,592 E | 2/2000 | Giebel et al. |
| 6,086,263 A | 7/2000 | Selli et al. |
| 6,088,499 A | 7/2000 | Newton et al. |
| 6,104,846 A | 8/2000 | Hodgson et al. |
| 6,122,420 A | 9/2000 | Satoh |
| 6,122,423 A | 9/2000 | You et al. |
| 6,137,936 A | 10/2000 | Fitz et al. |
| RE37,028 E | 1/2001 | Cooke et al. |
| 6,181,861 B1 | 1/2001 | Wenski et al. |
| 6,198,865 B1 | 3/2001 | Risch |
| 6,215,930 B1 | 4/2001 | Estes et al. |
| 6,241,399 B1 | 6/2001 | Nobuhara |
| 6,249,628 B1 | 6/2001 | Rutterman et al. |
| 6,255,584 B1 | 7/2001 | Renaud |
| 6,256,438 B1 | 7/2001 | Gimblet |
| 6,257,769 B1 | 7/2001 | Watanabe et al. |
| 6,273,621 B1 | 8/2001 | Eslambolchi et al. |
| 6,278,831 B1 | 8/2001 | Henderson et al. |
| 6,321,012 B1 | 11/2001 | Shen |
| 6,324,324 B1 | 11/2001 | Dixon et al. |
| 6,343,950 B1 | 2/2002 | Eginton et al. |
| 6,347,172 B1 | 2/2002 | Keller et al. |
| 6,356,690 B1 | 3/2002 | McAlpine et al. |
| 6,370,303 B1 | 4/2002 | Fitz et al. |
| 6,376,774 B1 | 4/2002 | Oh et al. |
| 6,400,873 B1 | 6/2002 | Gimblet et al. |
| 6,407,338 B1 | 6/2002 | Smith |
| 6,419,402 B1 | 7/2002 | Zimmel |
| 6,434,307 B1 | 8/2002 | Church |
| 6,439,776 B1 | 8/2002 | Harrison et al. |
| 6,439,777 B1 | 8/2002 | Harrison et al. |
| 6,454,464 B1 | 9/2002 | Nolan |
| 6,459,837 B1 | 10/2002 | Fitz et al. |
| 6,466,725 B2 | 10/2002 | Battey et al. |
| 6,481,903 B1 | 11/2002 | Varma et al. |
| 6,493,491 B1 | 12/2002 | Shen et al. |
| 6,493,500 B1 | 12/2002 | Oh et al. |
| 6,495,764 B1 | 12/2002 | Hori |
| 6,501,888 B2 | 12/2002 | Gimblet et al. |
| 6,519,395 B1 | 2/2003 | Bevan et al. |
| 6,527,986 B2 | 3/2003 | Blyler, Jr. et al. |
| 6,539,160 B2 | 3/2003 | Battey et al. |
| 6,542,674 B1 | 4/2003 | Gimblet |
| 6,546,175 B1 | 4/2003 | Wagman et al. |
| 6,576,166 B1 | 6/2003 | Perrin et al. |
| 6,579,014 B2 | 6/2003 | Melton et al. |
| 6,583,867 B1 | 6/2003 | Jennings et al. |
| 6,592,268 B2 | 7/2003 | Chen et al. |
| 6,619,697 B2 | 9/2003 | Griffioen et al. |
| 6,621,964 B2 | 9/2003 | Quinn et al. |
| 6,621,975 B2 | 9/2003 | Laporte et al. |
| 6,648,520 B2 | 11/2003 | McDonald et al. |
| 6,654,523 B1 | 11/2003 | Cole |
| 6,654,527 B2 | 11/2003 | Sakabe et al. |
| 6,655,016 B2 | 12/2003 | Renaud |
| 6,660,182 B2 | 12/2003 | Jester |
| 6,661,339 B2 | 12/2003 | Muirhead |
| 6,668,127 B1 | 12/2003 | Mahony |
| 6,701,047 B1 | 3/2004 | Rutterman et al. |
| 6,706,968 B2 | 3/2004 | Yaworski et al. |
| 6,707,979 B2 | 3/2004 | Wang et al. |
| 6,712,527 B1 | 3/2004 | Chan et al. |
| 6,714,710 B2 | 3/2004 | Gimblet |
| 6,744,954 B1 | 6/2004 | Tanaka et al. |
| 6,764,220 B2 | 7/2004 | Griffiths et al. |
| 6,801,695 B2 | 10/2004 | Lanier et al. |
| 6,807,347 B2 | 10/2004 | McAlpine et al. |
| 6,808,116 B1 | 10/2004 | Eslambolchi et al. |
| 6,810,194 B2 | 10/2004 | Griffiths et al. |
| 6,813,422 B1 | 11/2004 | Krishnamurthy et al. |
| 6,819,842 B1 | 11/2004 | Vogel et al. |
| 6,836,603 B1 | 12/2004 | Bocanegra et al. |
| 6,856,748 B1 | 2/2005 | Elkins, II et al. |
| 6,880,219 B2 | 4/2005 | Griffioen et al. |
| 6,899,467 B2 | 5/2005 | McDonald et al. |
| 6,901,191 B2 | 5/2005 | Hurley et al. |
| 6,907,164 B2 | 6/2005 | Lachance et al. |
| 6,928,217 B2 | 8/2005 | Mohler et al. |
| 6,937,801 B2 | 8/2005 | McAlpine et al. |
| 7,006,739 B2 | 2/2006 | Elkins, II et al. |
| 7,010,201 B2 | 3/2006 | Risch |
| 7,011,774 B2 | 3/2006 | Risch |
| 7,016,592 B2 | 3/2006 | Elkins, II et al. |
| 7,020,956 B2 | 4/2006 | Kuribayashi et al. |
| 7,088,893 B2 | 8/2006 | Cooke et al. |
| 7,090,406 B2 | 8/2006 | Melton et al. |
| 7,090,407 B2 | 8/2006 | Melton et al. |
| 7,113,680 B2 | 9/2006 | Hurley et al. |
| 7,127,143 B2 | 10/2006 | Elkins et al. |
| 7,146,090 B2 | 12/2006 | Vo et al. |
| 7,197,214 B2 | 3/2007 | Elkins, II et al. |
| 7,197,215 B2 | 3/2007 | Baird et al. |
| 7,218,821 B2 | 5/2007 | Bocanegra et al. |
| 7,242,841 B2 | 7/2007 | Greenwood et al. |
| 7,264,402 B2 | 9/2007 | Theuerkorn et al. |
| 7,306,382 B2 | 12/2007 | Qian et al. |
| 7,349,605 B2 | 3/2008 | Noonan et al. |
| 7,349,642 B2 | 3/2008 | Tatematsu et al. |
| 7,352,924 B2 | 4/2008 | Gaebe et al. |
| 7,379,642 B2 | 5/2008 | Kachmar |
| 7,393,148 B2 | 7/2008 | Allen et al. |
| 7,410,308 B2 | 8/2008 | Qian et al. |
| 7,458,103 B2 | 12/2008 | Citterio et al. |
| 7,461,983 B1 | 12/2008 | Gurreri et al. |
| 7,494,289 B1 | 2/2009 | Chen |
| 7,565,055 B2 | 7/2009 | Lu et al. |

(56) References Cited

U.S. PATENT DOCUMENTS

| | | | |
|---|---|---|---|
| 7,566,474 B2 | 7/2009 | Kachmar | |
| 7,693,375 B2 | 4/2010 | Freeland et al. | |
| 7,869,677 B2 | 1/2011 | Kachmar | |
| 8,041,166 B2 | 10/2011 | Kachmar | |
| 8,041,178 B2 | 10/2011 | Lu et al. | |
| 8,090,232 B2 | 1/2012 | Kachmar | |
| 8,107,781 B2 | 1/2012 | Kachmar et al. | |
| 8,290,320 B2 | 10/2012 | Kachmar | |
| 8,326,104 B2 | 12/2012 | Kachmar | |
| 8,333,519 B2 | 12/2012 | Marcouiller et al. | |
| 2001/0016103 A1* | 8/2001 | Hoch | 385/107 |
| 2001/0041035 A1 | 11/2001 | Uchida et al. | |
| 2002/0025127 A1 | 2/2002 | Graham et al. | |
| 2002/0146563 A1 | 10/2002 | Risch | |
| 2002/0181925 A1* | 12/2002 | Hodge et al. | 385/135 |
| 2002/0184747 A1 | 12/2002 | Kuribayashi et al. | |
| 2003/0007755 A1 | 1/2003 | Morita et al. | |
| 2003/0091307 A1 | 5/2003 | Hurley et al. | |
| 2003/0118296 A1 | 6/2003 | Smith | |
| 2003/0123838 A1 | 7/2003 | Wang et al. | |
| 2003/0169422 A1 | 9/2003 | Mukai | |
| 2004/0074852 A1 | 4/2004 | Knudsen et al. | |
| 2004/0105613 A1 | 6/2004 | Chown | |
| 2004/0105636 A1 | 6/2004 | Cottevieille et al. | |
| 2004/0123998 A1 | 7/2004 | Berglund et al. | |
| 2004/0126069 A1 | 7/2004 | Jong et al. | |
| 2004/0223720 A1 | 11/2004 | Melton et al. | |
| 2004/0228589 A1 | 11/2004 | Melton et al. | |
| 2004/0247265 A1 | 12/2004 | Takano et al. | |
| 2005/0053342 A1 | 3/2005 | Melton et al. | |
| 2005/0069275 A1 | 3/2005 | Brants et al. | |
| 2005/0111799 A1 | 5/2005 | Cooke et al. | |
| 2005/0111800 A1 | 5/2005 | Cooke et al. | |
| 2005/0123262 A1 | 6/2005 | Dowd et al. | |
| 2005/0129375 A1 | 6/2005 | Elkins, II et al. | |
| 2005/0147363 A1 | 7/2005 | Chastain et al. | |
| 2005/0175308 A1 | 8/2005 | Elkins, II et al. | |
| 2005/0213898 A1 | 9/2005 | Rubinstein et al. | |
| 2005/0259928 A1 | 11/2005 | Elkins, II et al. | |
| 2005/0259929 A1 | 11/2005 | Elkins, II et al. | |
| 2005/0259930 A1 | 11/2005 | Elkins, II et al. | |
| 2005/0276552 A1 | 12/2005 | Cooke et al. | |
| 2006/0056782 A1 | 3/2006 | Elkins, II et al. | |
| 2006/0093303 A1 | 5/2006 | Reagan et al. | |
| 2006/0153725 A1 | 7/2006 | Reagan et al. | |
| 2006/0159407 A1 | 7/2006 | Kachmar | |
| 2006/0193573 A1* | 8/2006 | Greenwood et al. | 385/103 |
| 2006/0291787 A1 | 12/2006 | Seddon | |
| 2007/0092178 A1 | 4/2007 | Gaebe et al. | |
| 2007/0098339 A1* | 5/2007 | Bringuier et al. | 385/106 |
| 2007/0127875 A1 | 6/2007 | Allen et al. | |
| 2007/0127878 A1 | 6/2007 | de Montmorillon et al. | |
| 2007/0189696 A1 | 8/2007 | Van Koetsem et al. | |
| 2007/0280615 A1 | 12/2007 | de Montmorillon et al. | |
| 2008/0187276 A1 | 8/2008 | Roberts et al. | |
| 2008/0292254 A1 | 11/2008 | Kachmar | |
| 2009/0034916 A1 | 2/2009 | LeBlanc | |
| 2009/0034917 A1* | 2/2009 | Burwell et al. | 385/99 |
| 2009/0297104 A1 | 12/2009 | Kachmar | |
| 2009/0317039 A1 | 12/2009 | Blazer et al. | |
| 2009/0317047 A1 | 12/2009 | Smith et al. | |
| 2010/0046894 A1 | 2/2010 | Kachmar | |
| 2010/0166370 A1* | 7/2010 | Cody et al. | 385/48 |
| 2011/0103755 A1 | 5/2011 | Kachmar | |
| 2011/0280525 A1* | 11/2011 | Marcouiller et al. | 385/99 |
| 2011/0286707 A1 | 11/2011 | Kachmar | |
| 2012/0106905 A1 | 5/2012 | Kachmar et al. | |
| 2012/0230646 A1* | 9/2012 | Thompson et al. | 385/135 |

FOREIGN PATENT DOCUMENTS

| | | | |
|---|---|---|---|
| DE | 20 2007 006 658 | U1 | 8/2007 |
| EP | 0 115 725 | A1 | 8/1984 |
| EP | 0 512 811 | A1 | 11/1992 |
| EP | 0 903 604 | A2 | 3/1999 |
| EP | 1 361 465 | A1 | 11/2003 |
| EP | 1 380 828 | A1 | 1/2004 |
| FR | 2 693 805 | A1 | 1/1994 |
| GB | 1 483 845 | | 8/1977 |
| GB | 2 096 343 | A | 10/1982 |
| GB | 2 296 575 | A | 7/1996 |
| JP | 58-105114 | | 6/1983 |
| JP | 60-169813 | | 9/1985 |
| JP | 60-169815 | | 9/1985 |
| JP | 61-27510 | | 2/1986 |
| JP | 61-190305 | | 8/1986 |
| JP | 61-220536 | | 9/1986 |
| JP | 62-54204 | | 3/1987 |
| JP | 62-59906 | | 3/1987 |
| JP | 63-136007 | | 6/1988 |
| JP | 63-180915 | | 7/1988 |
| JP | 63-287916 | | 11/1988 |
| JP | 63-310317 | | 12/1988 |
| JP | 1-138828 | | 5/1989 |
| JP | 2001-99946 | | 4/2001 |
| JP | 2001-116968 | | 4/2001 |
| JP | 2002-139651 | | 5/2002 |
| JP | 2003-177254 | | 6/2003 |
| JP | 2004-219944 | | 8/2004 |
| WO | WO 96/15466 | | 5/1996 |
| WO | WO 98/15857 | | 4/1998 |
| WO | WO 2005/017591 | A1 | 2/2005 |
| WO | WO 2005/119322 | A1 | 12/2005 |
| WO | WO 2006/044080 | A1 | 4/2006 |
| WO | WO 2006/050505 | A1 | 5/2006 |
| WO | WO 2006/052355 | A1 | 5/2006 |

OTHER PUBLICATIONS

"Dam/Blok™ Electrical Splice Kit," http://www.pmiind.com/products/damblok.html, 2 pages (Copyright 2000).

"Factory Installed Termination Systems for Fiber Optic Cable Splices," 1 page (admitted as prior art as of the filing date).

"Installation Instructions for Pre-Connectorized MIC® Cable (2-6 Fiber) Equipped with Plug & Play™ Systems Pulling Grips," *Corning Cable Systems*, Issue 7, pp. 1-3 (Jul. 2001).

"Pre-Connectorized (4-24 Fiber) Fiber Optic Cables Equipped with Plug & Play™ Systems Pulling Sleeves and Grips," *Corning Cable Systems*, Issue 1, pp. 1-7 (Mar. 2005).

ADC Spec Sheet, Fiber Optic Cable, Ruggedized Simplex and Duplex Cables, ADC ®, Oct. 2005, 4 pages.

ADC Spec Sheet, Fiber Optic Cable, Tactical Cables, ADC®, Oct. 2005, 4 pages.

Fiber Optic Cable LCF™ Microcable: Plenum, *ADC Telecommunications, Inc.*, 4 pages (Copyright 2005).

International Search Report and Written Opinion for PCT/US2006/014581 mailed Sep. 6, 2006.

International Search Report and Written Opinion for PCT/US2006/014751 mailed Jan. 5, 2007.

International Search Report and Written Opinion for PCT/US2009/055334 mailed Dec. 10, 2009.

International Search Report and Written Opinion for PCT/US2009/062363 mailed Feb. 1, 2010.

Superior Essex, FTTP Tight Buffered Indoor/Outdoor Drop, Series W7, RoHS, Product Bulletin, OSP Fiber Products, 2 pages (Nov. 2008).

* cited by examiner

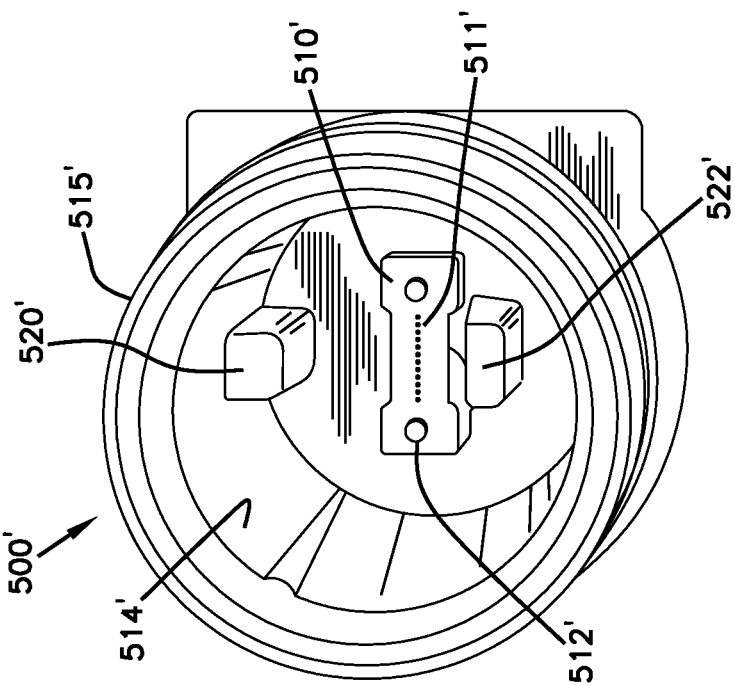
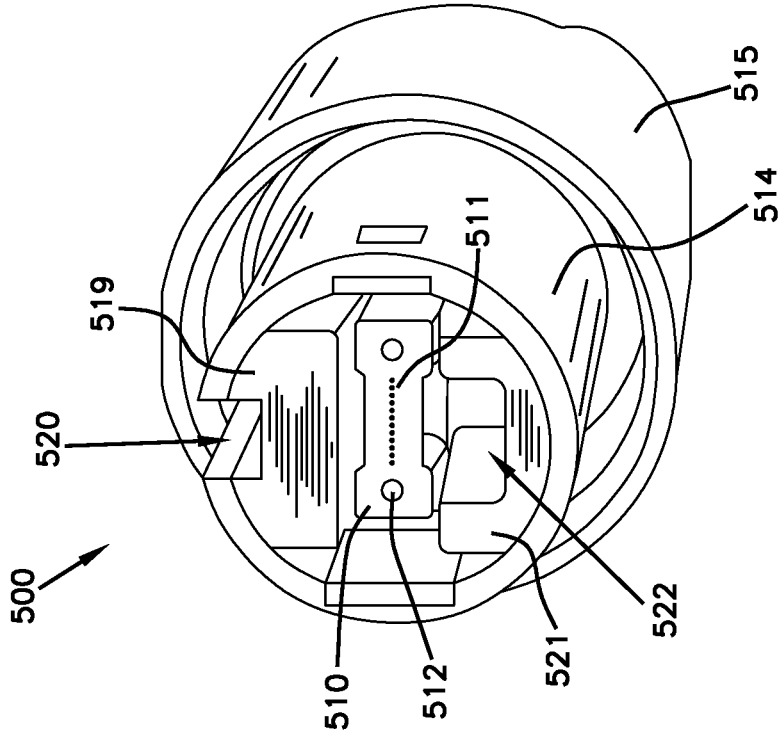

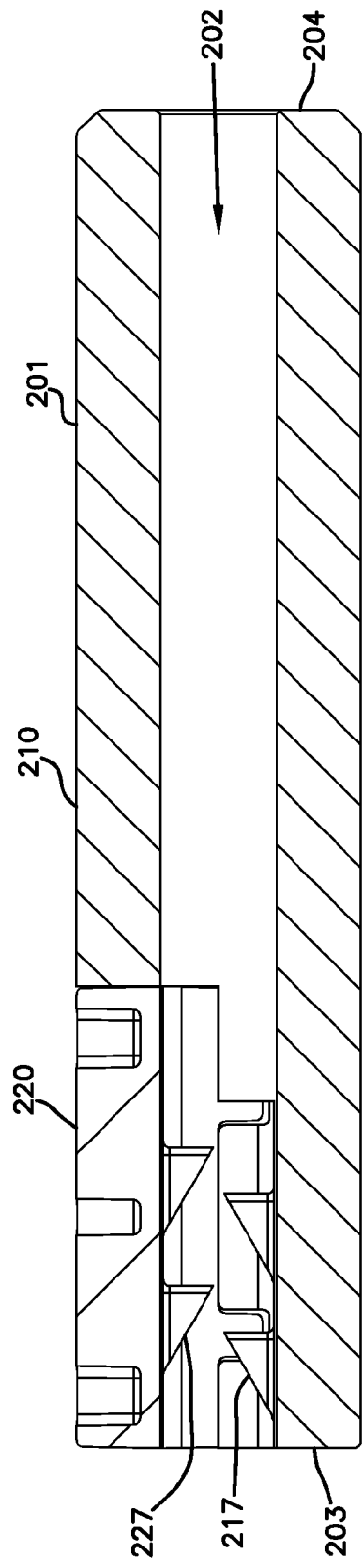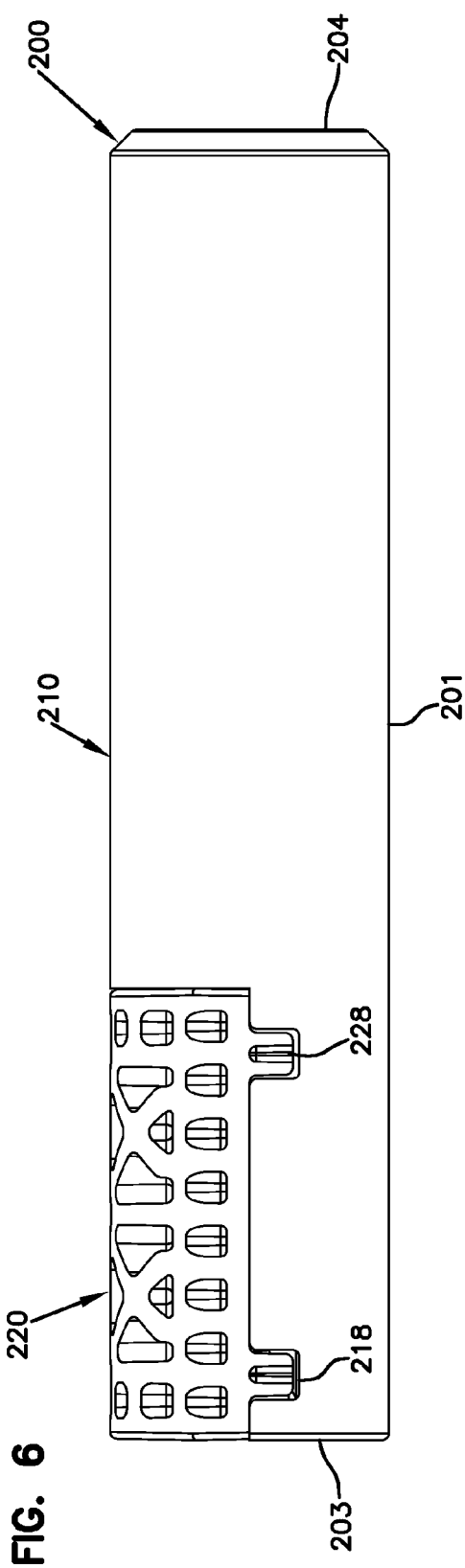

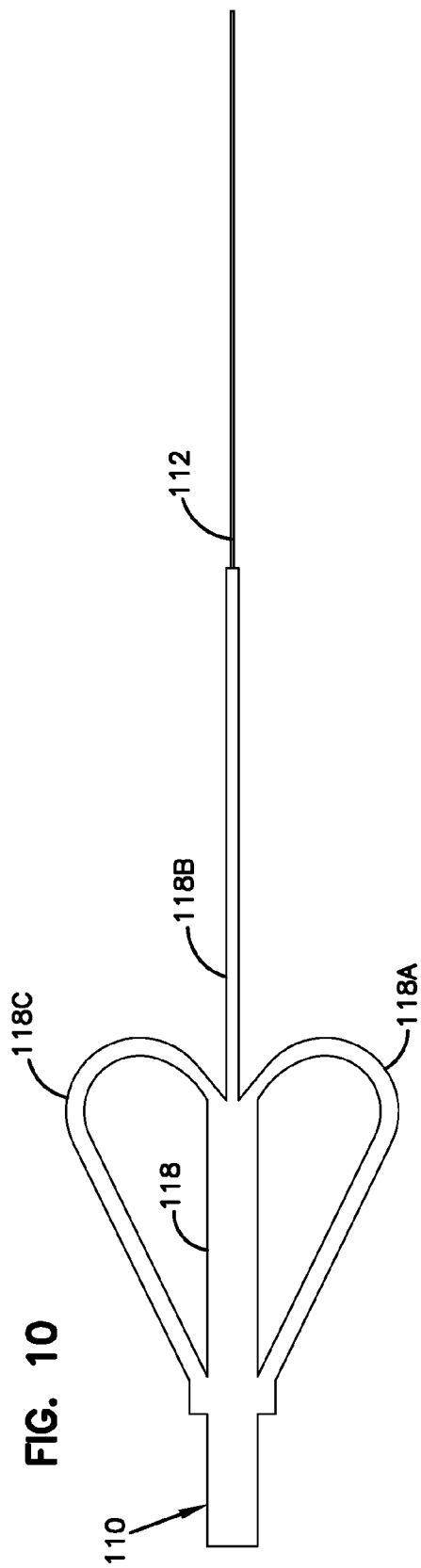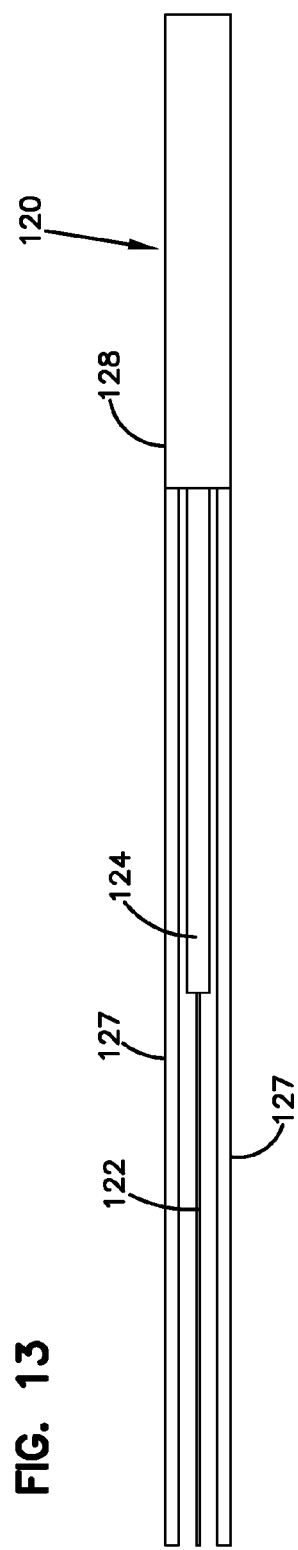

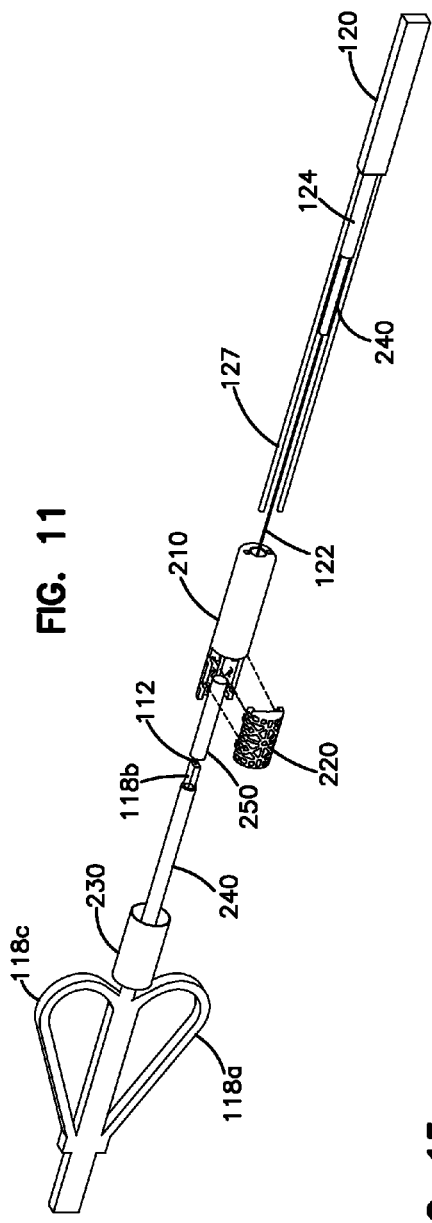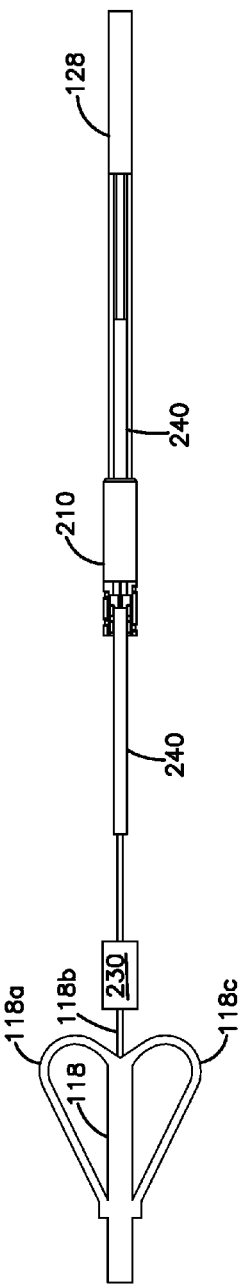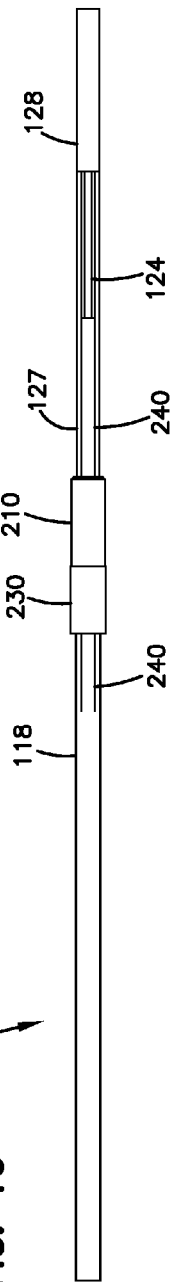

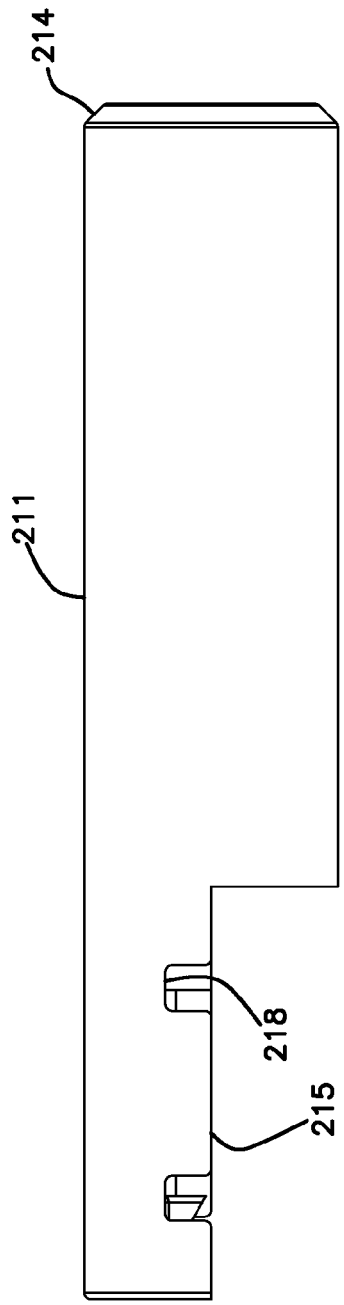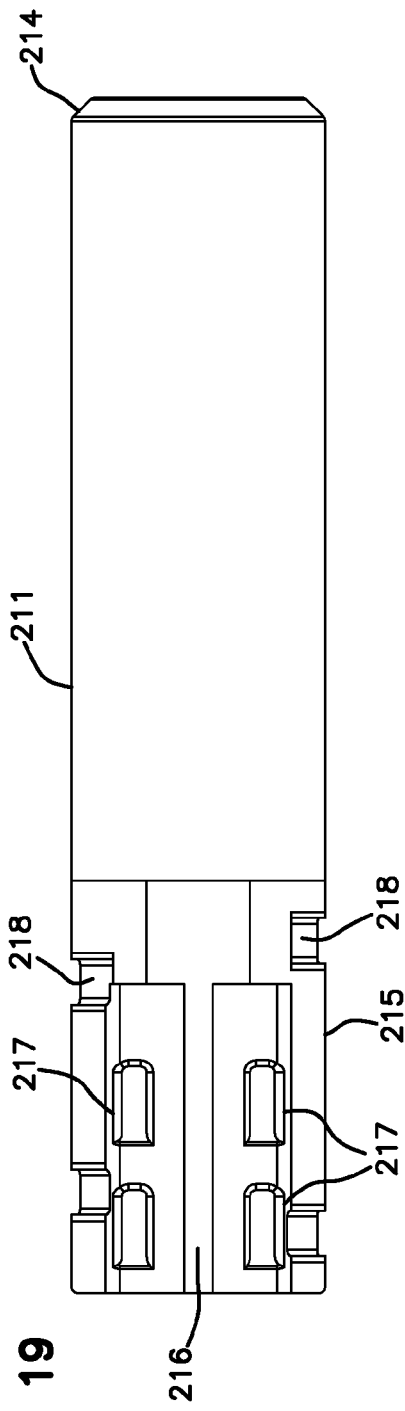

SPLICE ENCLOSURE ARRANGEMENT FOR FIBER OPTIC CABLES

CROSS-REFERENCE TO RELATED APPLICATION

This application claims the benefit of U.S. Provisional Patent Application Ser. No. 61/421,314, filed Dec. 9, 2010, which application is hereby incorporated by reference in its entirety.

TECHNICAL FIELD

The present disclosure relates generally to a fiber optic data transmission system. More particularly, the present disclosure relates to splice configurations for use with fiber optic data transmission systems.

BACKGROUND

Fiber optic telecommunications technology is becoming more prevalent in part because service providers want to deliver high bandwidth communication capabilities to customers. A typical fiber optic telecommunications system includes a network of fiber optic cables (e.g., distribution cables or branch cables such as drop cables or stub cables) routed from a central location (e.g., a service provider's central office) to remote locations in close proximity to subscribers. The fiber optic telecommunications systems also can include additional components, such as fiber distribution hubs housing optical splitters for splitting optical signals and drop terminals providing interconnect locations for facilitating connecting subscribers to the fiber optic network.

U.S. Pat. No. 7,349,605 A1, which is hereby incorporated herein by reference in its entirety, discloses a fiber optic network including a distribution cable having factory terminated breakout locations. Each factory terminated breakout location includes a tether having a free end connectorized with a factory installed multi-fiber connector. In the field, the multi-fiber connector allows the tether to be quickly connected to a branch cable. One end of the branch cable includes a multi-fiber connector adapted to interconnect with the multi-fiber connector of the tether to provide optical connections between the optical fibers of the branch cable and the optical fibers of the tether. The other end of the branch cable is connected to a drop terminal.

When an optical connector is installed at the end of an optical cable such as a branch cable, it is often desirable to have a certain length of excess fiber that extends beyond a jacketed end portion of the cable to facilitate the connector installation process. For example, the excess fiber length facilitates low pressure polishing of a ferrule of the fiber optic connector and also facilitates mechanically coupling the fiber optic connector to the fiber optic cable. However, due to friction within the fiber optic cable, it can be difficult to withdraw a sufficient length of fiber from the end of the cable for use during the installation process. This is particularly true for longer lengths of cable (e.g., cable longer than 18 feet). Improved techniques for connectorizing fiber optic cables are needed.

SUMMARY

The present disclosure relates to techniques for splicing a first fiber optic cable segment to a second fiber optic cable segment. The present disclosure also relates to splice enclosures for protecting splices used for mechanically coupling two fiber optic cable segments that have been spliced together.

BRIEF DESCRIPTION OF THE DRAWINGS

FIGS. 5A and 5B provide one example set of connectors suitable for use with the connector arrangement terminating one end of the second cable segment in accordance with aspects of the disclosure;

FIG. 6 shows one example implementation of a splice enclosure arrangement suitable for use in coupling together the first ends of the first and second cable segments in accordance with aspects of the disclosure;

FIG. 7 is a cross-sectional view of FIG. 6 taken along a longitudinally extending plane;

FIGS. 10 and 11 illustrate the steps of the first preparation process of FIG. 9;

FIGS. 11 and 13 illustrate the steps of the second preparation process of FIG. 12;

FIGS. 15 and 16 show the results of the steps of the mounting process of FIG. 14; and FIGS. 17-31 illustrate one example housing suitable for use in implementing the steps of the example mounting process of FIG. 14.

DETAILED DESCRIPTION

Figure 1:
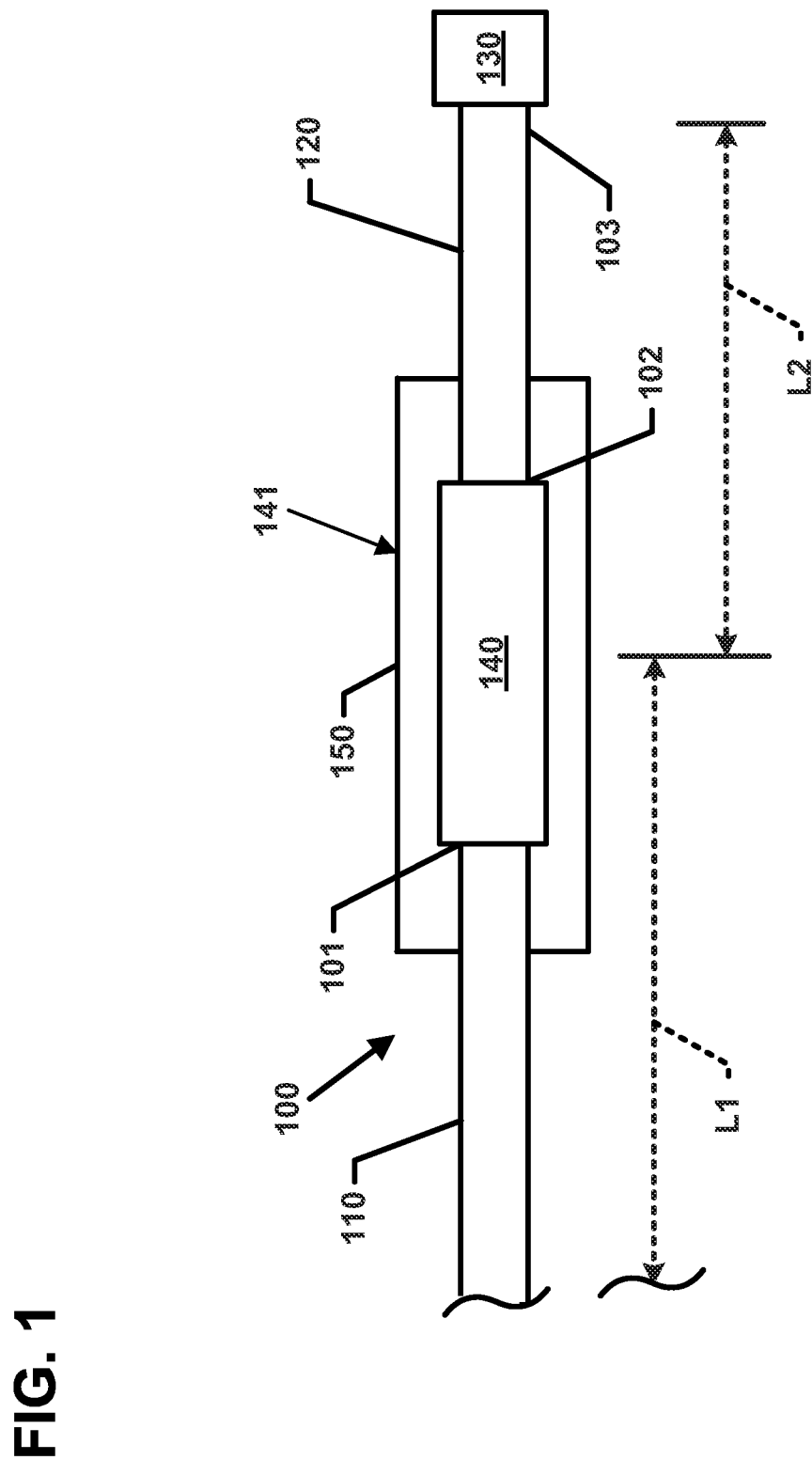
FIG. 1 is a schematic view of a second cable segment optically coupled to a first cable segment at a splice point that is secured within a splice enclosure in accordance with aspects of the disclosure.

In many circumstances, fiber optic cables may be manufactured in long segments. For example, some fiber optic cables may be several hundred meters long. One end of fiber optic cable may be connected to a connector arrangement, e.g., a drop terminal, and the opposite end may be unconnectorized. To attach certain types of connectors to the unconnectorized end of the fiber optic cable, terminal segments of optical fibers are caused to extend beyond the end of fiber optic cable. For example, when attaching a multi-fiber connector, such as the OptiTip multi-fiber connector sold by Corning Cable Systems (see U.S. Pat. No. 7,264,402), to fiber optic cable, it may be desirable for the terminal segments of optical fibers to extend approximately seven inches (~18 centimeters) beyond the ends of jacket.

Several issues may arise when attempting to expose terminal segments of optical fibers when attaching a connector to a fiber optic cable. For example, friction within the fiber optic cable may prevent the exposure of terminal segments of optical fibers by telescopically sliding optical fibers out of an end of buffer tube when the fiber optic cable is longer than a certain length. In some instances, optical fibers can only slide within the buffer tube without breaking when the length of fiber optic cable is less than eighteen feet. Consequently, to connectorize certain types of fiber optic cables that are longer than eighteen feet, it desirable to use an operation other than just sliding optical fibers within buffer tubes of the fiber optic cables.

Certain aspects of the present disclosure related to a process whereby a second cable segment of relatively short length is spliced to a first cable segment of substantially longer length. Because the second cable segment has a relatively short length (e.g., less than eighteen feet), optical fiber can be slid outwards from one end of the second cable segment to facilitate connectorizing one end of the second cable segment. After connectorization, the optical fibers can be slid back into the second cable segment and the second cable segment can subsequently be spliced to the first cable segment.

In general, this specification discloses implementation techniques for splicing together at least two optical fibers of at least two cable segments. In accordance with some aspects, this specification discloses techniques for splicing together two different types of fiber optic cable segments. For example, in some implementations of this disclosure, a first optical cable including a first type of strength members can be spliced to a second optical cable including a second type of strength members. In one implementation, the strength members of the first cable segment can be more flexible (i.e., less rigid) than the strength members of the second cable segment. In another implementation, the strength members of the first cable segment can be more rigid (i.e., less flexible) than the strength members of the second cable segment. In a further implementation, a first end of the second cable segment is pre-connectorized prior to splicing a second end of the second cable segment to the first cable segment, and the second cable segment is substantially shorter in length than the first cable segment.

FIG. 1 is a schematic diagram of an example telecommunications cable 100 having a first end terminated at a connector arrangement 130. The example cable 100 includes a first cable segment 110 having a length L1 of at least eighteen feet and a second cable segment 120 having a length L2 of no more than eighteen feet. Of course, in other implementations, other lengths could be used as well. A first end 101 of the first cable segment 110 is spliced to a first end 102 of the second cable segment 120 to form the example telecommunications cable 100. In some implementations, the first cable segment 110 has substantially the same characteristics as the second cable segment 120. In other implementations, however, the two cable segments 110, 120 can have different characteristics.

Referring to FIG. 1, each cable segment 110, 120 includes at least one optical fiber. The optical fibers are preferably silica-based, single mode fibers, but they can be any type of optical fiber including, for example, a multi-mode or dispersion shifted optical fibers. The length L1 of the first cable segment 110 is greater than the length L2 of the second cable segment 120. Accordingly, only a portion of the first cable segment 110 adjacent the first end 101 is shown in FIG. 1. A second end 103 of the second cable segment 120 is terminated at a fiber optic connector arrangement 130. In accordance with some aspects, because the second cable segment 120 is less than a certain distance (e.g., eighteen feet), the second cable segment 120 can be connectorized with the connector arrangement 130 by sliding the optical fibers out of an end of the buffer tube. In certain implementations, the cable is of a construction such that fibers can be pulled from the cable only if the cable is less than about eighteen feet in length. However, for other cable types, this length may vary. Thus, aspects of the present disclosure apply to other lengths as well.

In some implementations, the optical fibers at the second end 103 of the second cable segment 120 can be terminated at a multi-fiber connector. In other implementations, the optical fibers can be terminated at multiple multi-fiber connectors. In still other implementations, the optical fibers at the second end 103 of the second cable segment 120 can be terminated at multiple single fiber connectors. In certain implementations, the fiber optic connector arrangement 130 is a hardened connector arrangement as will be described in more detail herein.

Splicing the second cable segment 120 to the first cable segment 110 optically couples together the optical fibers of the cable segments 110, 120 at a splice location. The spliced optical fibers at the splice location are protected within a splice enclosure arrangement 141, which will be described in more detail herein. The splice enclosure arrangement 141 can include a splice housing 140 enclosed within a protective layer 150. In accordance with certain aspects, strength members of the cable segments 110, 120 can be secured to the splice housing 140 to provide strain relief protection. The protection layer (e.g., a heat shrink layer) 150 surrounds the spice housing 140 and the first ends 101, 102 of the cable segments 110, 120 to protect any exposed optical fibers from dust, dirt, or other contaminants.

Figure 2:
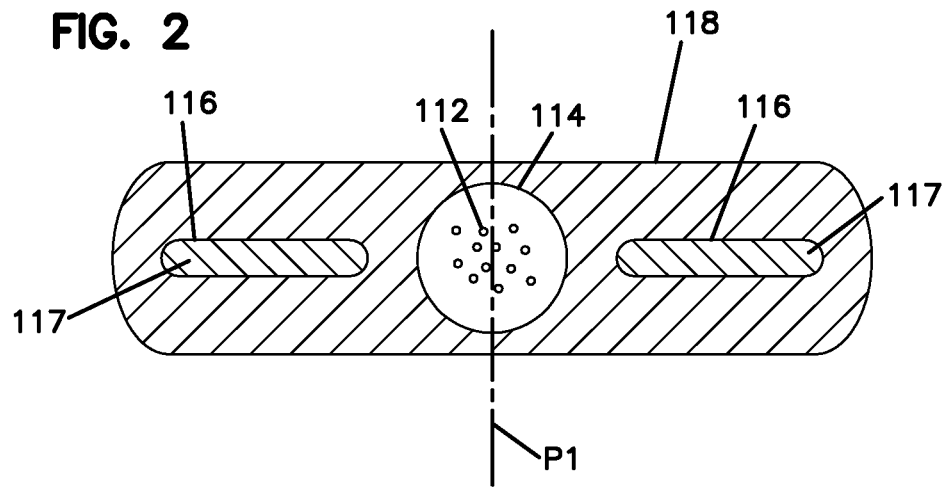
FIG. 2 shows one example implementation of a first cable segment suitable to be spliced to a second cable segment in accordance with aspects of the disclosure.

FIG. 2 shows one example implementation of a first cable segment 110 suitable to be spliced to a second cable segment 120. The example first cable segment 110 includes an outer jacket 118 defining at least a first passage 114 for containing at least one optical fiber 112 and at least a second passage 116 for containing at least one strength member 117. In one implementation, the outer jacket 118 includes a central passage 114 for containing optical fibers 112 and two passages 116 on opposite sides of the central passage 114 for containing strength members 117. In other implementations, the first cable segment 110 can include greater or fewer strength members 117 enclosed within the jacket 118.

In accordance with some aspects, the first cable segment 110 has an elongated transverse cross-sectional profile (e.g., a flattened cross-sectional profile, an oblong cross-sectional profile, an obround cross-sectional profile, etc.) defined by the outer jacket 118. The major axis and the minor axis of the cross-sectional profile intersect perpendicularly at a lengthwise axis of the cable segment 110. The construction of the first cable segment 110 allows the cable segment 110 to be bent more easily along a plane P1 that coincides with the minor axis than along a plane that coincides with the major axis. Such a construction allows the first cable segment 110 to be readily used for applications in which drop cables are normally used and also allows the first cable segment 110 to be wrapped around a cable storage spool having a relatively small diameter without damaging the cable segment 110. Other implementations of the first cable segment 110 can have round, oval, or other transverse cross-sectional profiles, however.

In accordance with some aspects, the outer jacket 118 can be shaped through an extrusion process and can be made by any number of different types of polymeric materials. In certain embodiments, the outer jacket 118 can have a construction the resists post-extrusion shrinkage of the outer jacket 118. For example, the outer jacket 118 can include a shrinkage reduction material disposed within a polymeric base material (e.g., polyethylene). U.S. Pat. No. 7,379,642, which is hereby incorporated by reference in its entirety, describes an exemplary use of shrinkage reduction material within the base material of a fiber optic cable jacket.

In some implementations, the first passage 114 of the outer jacket 118 is sized to receive one or more of the bend insensitive fibers 112. The bend insensitive fibers 112 are preferably unbuffered and in certain embodiments have outer diameters in the range of 230-270 µm. In one implementation, the first passage 114 is sized to receive at least twelve of the bend insensitive fibers 112. When the fibers 112 are positioned within the first passage 114, it is preferred for the fibers 112 to occupy less than 60% of the total transverse cross-sectional area defined by the first passage 114. In some implementations, structures such water-swellable fibers, water-swellable tape, or water-swellable yarn can be provided within the passage 114 to prevent water from migrating along the first passage 114. In other implementations, water-blocking gel may be provided within the first passage 114.

In accordance with some implementations, the strength members 117 of the first cable segment 110 have a transverse cross-sectional profile that matches the transverse cross-sectional profile of the second passage 116. In one implementation, each strength members 117 has a width that is greater than a thickness of the strength member 117. In certain implementations, the strength members 117 are bonded to the outer jacket 118. For example, the bonding between the strength members 117 and the outer jacket 118 can be chemical bonding or thermal bonding.

Figure 3:
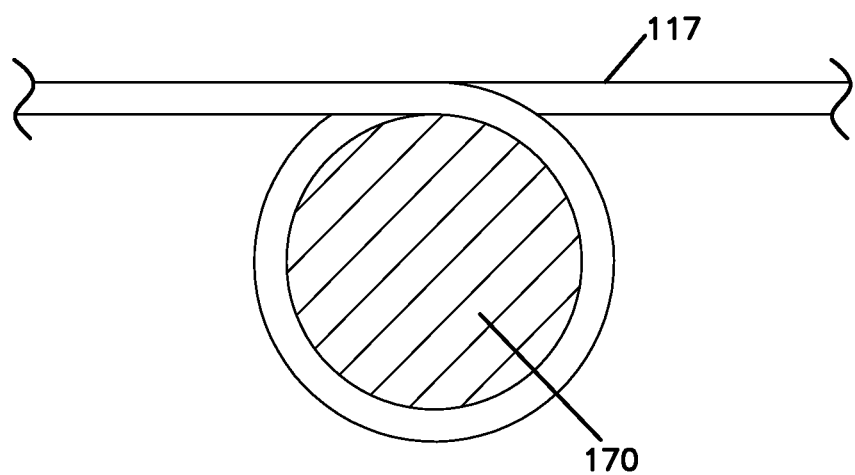
FIG. 3 shows the first cable segment of FIG. 2 being wound around a mandrel in accordance with aspects of the disclosure.

In accordance with some aspects, each strength members 117 has a construction that is highly flexible and highly strong in tension. For example, in certain implementations, the strength members 117 provide the vast majority of the tensile load capacity of the first cable segment 110. In certain implementations, each strength member 117 also has a flexibility that allows the strength member 117 to be wrapped at least 360 degrees around a mandrel 170 (see FIG. 3) having a 10 millimeter outer diameter for one hour without undergoing/experiencing meaningful deterioration/degradation of the tensile strength properties of the strength member 117.

In certain embodiments, the strength member 107 is formed by a generally flat layer of reinforcing elements (e.g., fibers or yarns such as aramid fibers or yarns) embedded or otherwise integrated within a binder to form a flat reinforcing structure (e.g., a structure such as a sheet-like structure, a film-like structure, or a tape-like structure). In one example embodiment, the binder is a polymeric material such ethylene acetate acrylite (e.g., UV-cured, etc.), silicon (e.g., RTV, etc.), polyester films (e.g., biaxially oriented polyethylene terephthalate polyester film, etc.), and polyisobutylene. In other example instances, the binder may be a matrix material, an adhesive material, a finish material, or another type of material that binds, couples or otherwise mechanically links together reinforcing elements.

In other embodiments, the strength member 107 can have a glass reinforced polymer (GRP) construction. The glass reinforced polymer can include a polymer base material reinforced by a plurality of glass fibers such as E-glass, S-glass or other types of glass fiber. The polymer used in the glass reinforced polymer is preferably relatively soft and flexible after curing. For example, in one embodiment, the polymer has a Shore A hardness less than 50 after curing. In other embodiments, the polymer has a Shore A hardness less than 46 after curing. In certain other embodiments, the polymer has a Shore A hardness in the range of about 34-46.

Additional details regarding the example first cable segment 110 can be found in U.S. application Ser. No. 12/607,748, filed Oct. 28, 2009, and titled "Flat Drop Cable," the disclosure of which is hereby incorporated herein by reference in its entirety. Of course, other types of fiber optic cables having different tensile strength and flexibility characteristics can be used as the first cable segment.

Figure 4:
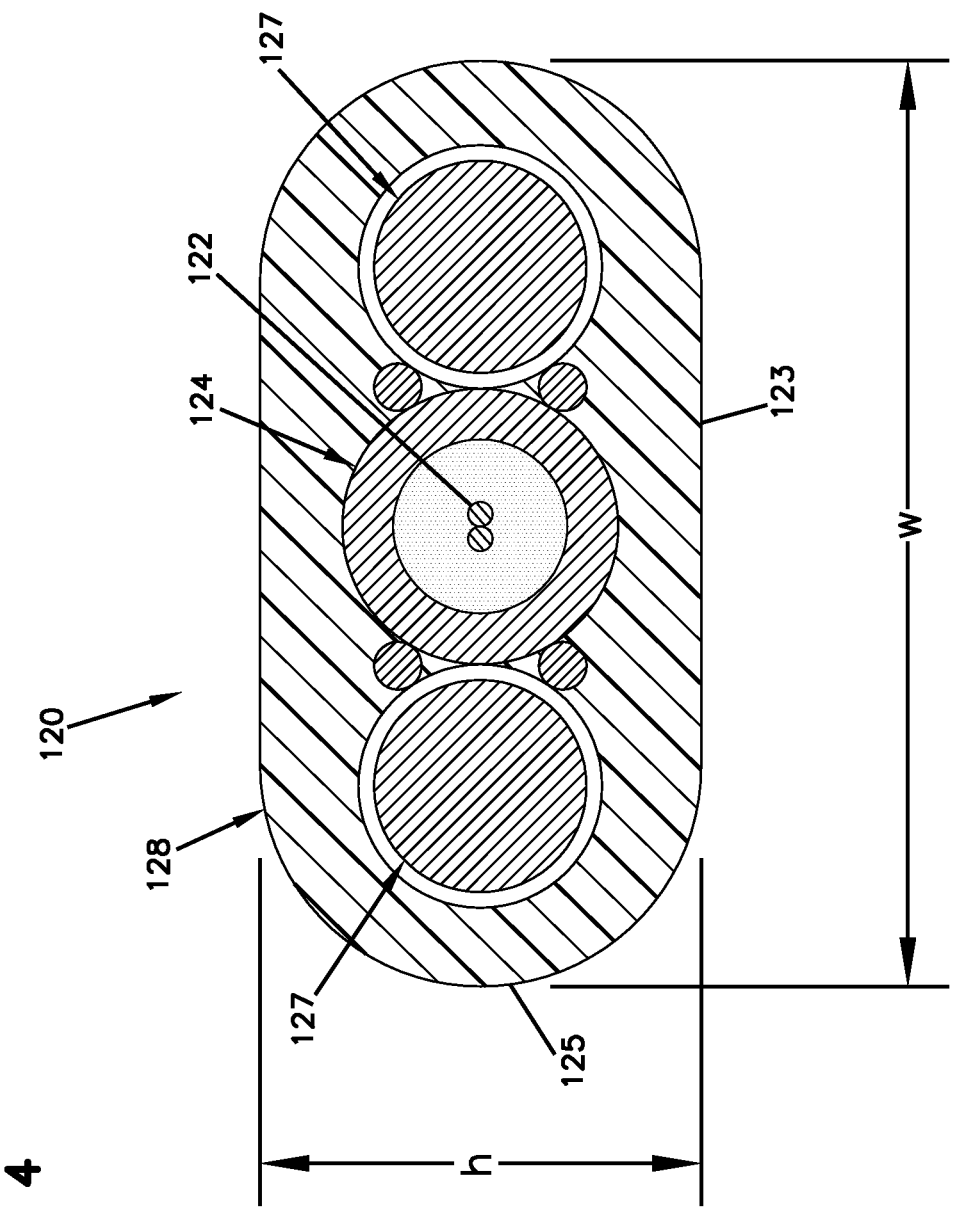
FIG. 4 shows one example implementation of a second cable segment suitable to be spliced to the first cable segment in accordance with aspects of the disclosure.

FIG. 4 shows one example implementation of a second cable segment 120 suitable to be spliced to the first cable segment 110. The second cable segment 120 includes a cable jacket 128 enclosing at least one optical fiber 122. In one implementation, the optical fiber 122 is loosely received within a buffer tube 124. The buffer tube 124 can include at least one waterblocking substance, for example, a gel, grease, and/or a superabsorbent material. In some implementations, the second fiber cable segment 120 has a generally flat configuration. For example, the jacket 128 can define generally arcuate sections 125 and generally flat-sided sections 123. Other implementations of the second cable segment 120, however, can have round, oval, or other transverse cross-sectional profiles.

The second cable segment 120 also includes at least one strength component 127. In the example shown in FIG. 4, the optical transmission component 122 is disposed between two strength components 127. In other implementations, however, greater or fewer strength components 127 can be used. In accordance with certain aspects, the strength components 127 have both tensile and anti-buckling characteristics. In some implementations, the strength components 127 are solid, rod-like members formed of dielectric materials. For example, in one implementation, a strength component 127 includes glass filaments impregnated and bonded together with a resin to define a single unit having a tensile strength rating of about 500 Newtons @ 0.5% strain.

Additional details regarding the example second cable segment 120 can be found in U.S. Pat. No. 6,542,674, titled "Fiber Optic Cables with Strength Members," and issued Apr. 1, 2003 to Corning Cable Systems, LLC, the disclosure of which is hereby incorporated by reference herein. Of course, other types of fiber optic cables having different tensile strength and flexibility characteristics can be used as the second cable segment.

In some implementations, the connector arrangement 130 terminating the second end 103 of the second cable segment 120 is a plug-type connector. In one implementation, the plug-type connector is configured to interface directly with a receptacle-type connector. In another implementation, the plug-type connector is configured to interface with another plug-type connector at an adapter. In other implementations, the connector arrangement 130 terminating the second end 103 of the second cable segment 120 is a receptacle-type connector.

FIGS. 5A and 5B provide one example set of connectors suitable for use with the connector arrangement 130. An example plug-type connector 500 is shown in FIG. 5A and an example receptacle-type connector 500' is shown in FIG. 5B. The first example connector 500 is sized and shaped to interface with the second example connector 500' without an adapter. In some implementations, the plug 500 and receptacle 500' are threaded together.

The plug-type connector 500 includes a ferrule 510 at which one or more optical fibers 511 are terminated. In some implementations, the ferrule 510 terminates multiple (e.g., two, eight, twelve, sixteen, twenty-four, forty-eight, seventy-two, etc.) optical fibers 511. In the example shown, the ferrule 510 terminates twelve optical fibers 511. The ferrule 510 defines alignment openings 512 at either side of the optical fibers 511. The ferrule 510 is enclosed within a shroud 514 that defines keying and latching features. An internally threaded outer housing 515 is mounted over at least a portion of the shroud 514. The shroud 514 extends beyond the ferrule 510. The shroud 514 defines a first keying channel 520 and a second keying channel 522 above and below the ferrule 510, respectively.

The receptacle-type connector 500' also includes a ferrule 510' at which one or more optical fibers 511' are terminated. In some implementations, the ferrule 510' terminates multiple (e.g., two, eight, twelve, sixteen, twenty-four, forty-eight, seventy-two, etc.) optical fibers 511. In the example shown, the ferrule 510' terminates twelve optical fibers 511'. The ferrule 510' defines projections 512' at either side of the optical fibers 511'. The projections 512' are configured to be inserted into the alignment openings 512 of the plug ferrule 510 to facilitate alignment of the ferrules 510, 510'.

The receptacle ferrule 510' is enclosed within an externally threaded outer housing 515' that defines a cavity 514' that is sized and shaped to receive the shroud 514 of the plug 500. The outer housing 515' is configured to surround the shroud 514. In some implementations, the outer housing 515' threads together with the outer housing 515 to retain the plug 500 and the receptacle 500' in a mated configuration. A first keying projection 520' and a second keying projection 522' are positioned within the cavity 514' above and below the ferrule 510', respectively. The projections 520', 522' are adapted to fit within the keying channels 520, 522. In some implementations, the first and second keying projections 520', 522' have different shapes and/or sizes to facilitate finding the correct orientation of the plug and receptacle.

In some implementations, the connectors 500, 500' are hardened fiber optic connectors. For example, hardened connectors 500, 500' may include an environmental seal when interfaced together to protect the ferrules 511, 511' from dust, dirt, moisture, or other contaminants. In some implementations, an environmental dust cap can be mounted to the connectors 500, 500' to protect the ferrules 511, 511' prior to deployment of the cable 100 or prior to connection of the connectors 500, 500'.

Additional details regarding the example connector plug 500 and receptacle 500' can be found in U.S. Pat. No. 7,264,402 to Theuerkorn et al., issued Sep. 4, 2007, and titled Multi-fiber optic receptacle and plug assembly, the disclosure of which is hereby incorporated by reference herein.

Referring to FIGS. 6 and 7, one example system and process for splicing together the first and second cable segments 110, 120 are shown. FIGS. 6 and 7 show one example housing 200 of the splice enclosure housing 140 (FIG. 1) suitable for use in coupling together the first ends 101, 102 of the first and second cable segments 110, 120. The housing 200 includes a tubular body 201 defining a generally hollow interior 202 having a first end 203 and a second end 204 (see FIG. 6). Strength members 117 of the first cable segment 110 can be secured to the first end 203 of the enclosure body 201 to inhibit damage to the splice from pull (e.g., axial load/tension) on the first cable segment 110. Strength components 127 of the second cable segment 120 can be secured to the second end 204 of the enclosure body 201 to inhibit damage to the splice from pull (e.g., axial load/tension) on the second cable segment 120.

The example housing 200 includes a first enclosure member 210 (see FIG. 17-24) and a second enclosure member 220 (see FIG. 25-31) that are configured to attach together to form the generally tubular enclosure body 201. For example, in some implementations, the first and second enclosure members 210, 220 can be held together by a sleeve 230 (see FIG. 15) mounted around the members 210, 220. In one implementation, the sleeve 230 can be crimped to the enclosure body 201 over the members 210, 220. In other implementations, the second enclosure member 220 can be snap-fit, friction-fit, glued, or otherwise secured to the first enclosure member 210. For example, in one implementation, the second enclosure member 220 can be overmolded in place relative to the first enclosure member 210.

Figure 8:
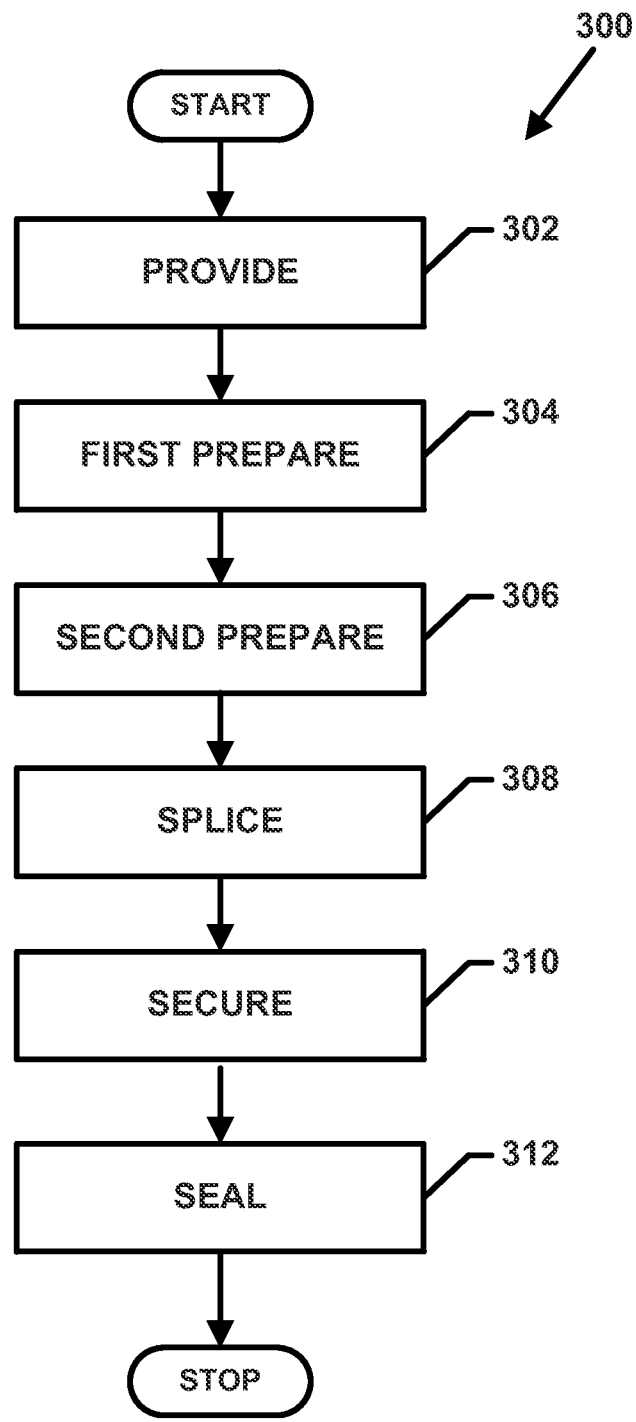
FIG. 8 shows a flowchart illustrating an example splicing process by which the second cable segment of FIG. 4 can be spliced to the first cable segment of FIG. 2.

FIG. 8 shows a flowchart illustrating an example splicing process 300 by which the second cable segment 120 can be spliced to the first cable segment 110. It should be appreciated that the operation illustrated in the example of FIG. 8 is provided for explanatory purposes and is not intended to represent a sole way of practicing the techniques of this disclosure. Rather, the techniques of this disclosure may be practiced in many ways.

A technician is initially provided 302 with two cable segments, such as the example first and second cable segments 110, 120 described above. The technician also is provided 302 with a splice enclosure housing, such as the housing 200 shown in FIGS. 6 and 7. The technician prepares 304 the first cable segment 110 for splicing as will be described in more detail herein. The technician also prepares 306 the second cable segment 120 for splicing as will be described in more detail herein. In some implementations, preparing 304 the cable segments 110, 120 includes pre-arranging the housing 200 on the cable segments 110, 120 prior to splicing the cable segments 110, 120.

The technician splices 308 together the optical fibers 112, 122 of the prepared first and second cable segments 110, 120. For example, in some implementations, the technician can splice together (e.g., fusion splice) two ribbonized sets of fibers 112, 122. In certain implementations, the technician mounts a splice sleeve 250 (see FIG. 11) onto one of the cable segments 110, 120 prior to splicing 308 the fibers 112, 122. When the fibers 112, 122 have been spliced together, the technician positions the splice sleeve 250 over the splice. For example, the technician may heat shrink the splice sleeve 250 over the splice. In certain implementations, the technician can perform one or more optical tests to confirm that the splice did not negatively affect the fibers 112, 122.

The technician secures 310 the splice housing 200 to the cable 100 at the splice location, e.g., as described in more detail herein. In some implementations, the technician connects the first and second cable segments 110, 120 (e.g., strength elements 117, 127) to the first enclosure member 210. The technician also attaches the first and second enclosure members 210, 220 to each other (e.g., see FIG. 6) to enclose and protect the splice location.

The technician seals 312 the splice enclosure housing 200 and the stripped portions of the cable segments 110, 120 in the protective enclosure 150 (FIG. 1). For example, in one implementation, the technician can overmold the cable 100 at the splice location to form the protective enclosure 150 (FIG. 1). In another implementation, the technician can seal the splice location and stripped portions on the cable 100 using a heat-shrink tube.

Figure 9:
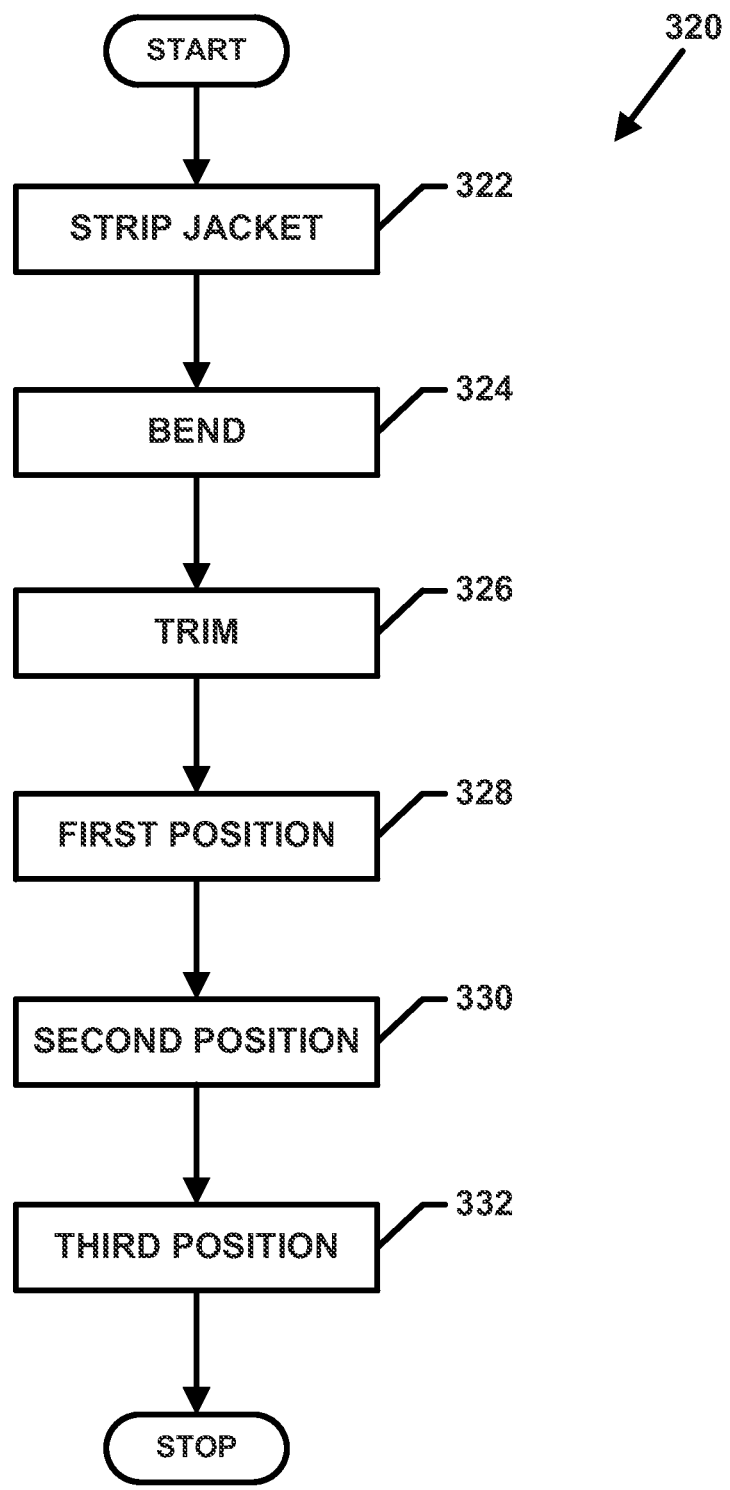
FIG. 9 is a flowchart illustrating an example first preparation process by which the technician can implement preparing the first cable segment for splicing.

FIG. 9 is a flowchart illustrating an example first preparation process 320 by which the technician can implement preparing 304 the first cable segment 110 for splicing. FIGS. 10 and 11 illustrate the steps of the first preparation process 320. In the example first preparation process 320, the technician cuts 322 at least a portion of the outer jacket 118 to separate the strength members 117 from the optical fibers 112. For example, in some implementations, the technician strips the outer jacket 118 from the optical fibers 112 along an end portion of the cable segment 110.

In certain implementations, the technician can axially cut the cable outer jacket 118 of the cable segment 110 to form three separate cable strips 118a, 118b, and 118c (FIG. 10). In some implementations, the two outer strips 118a and 118c of the cable segment 110 each include one of the strength members 117 surrounded by a portion of the outer jacket 118. The intermediate cable strip 118b includes the optical fibers 112 surrounded at least by a portion of the outer jacket 118. In one implementation, the fibers 112 are surrounded by a buffer tube contained within the portion of outer jacket 118. In one implementation, the outer jacket 118 can be stripped away from the optical fibers 112 at an end portion of the intermediate strip 118b (e.g., see FIG. 10).

The technician bends back 324 the outer cable strips 118a, 118c to facilitate the splicing process (see FIG. 10). By bending back the strength member portions 118a, 118c of the cable segment 110, the technician enhances access to the optical fibers 112 of the intermediate strip 118b. In some implementations, the technician secures the outer strips 118a, 118c to the cable segment 110 in the bent-back position. For example, in one implementation, the outer strips 118a, 118c are retained with a cable tie. In another implementation, the outer strips 118a, 118c are retained with a cable clamp. In other implementations, however, the strips 118a, 118c are bent out of the way, but not restrained.

The technician trims 326 the outer cable strips 118a, 118c to an appropriate length (see FIG. 10). For example, the technician can trim 326 the outer cable strips 118a, 118c to have sufficient length to reach, but not extend past, the splice location. The technician also can trim 326 the outer jacket 118 of the intermediate strip 118b to expose a length of bare optical fibers 112. The technician also can trim the bare optical fibers 112 extending out from the intermediate strip 118b to have a suitable length for splicing.

In accordance with some aspects, the technician pre-arranges the housing 200 on the first cable segment 110. For example, the technician can position 328 the enclosure sleeve 230 over at least the intermediate strip 118b of the first cable segment 110. The technician also can position 330 a first length of tubing 240 over the intermediate strip 118b of the first cable segment 110. The tubing 240 is configured to provide heat protection to the intermediate strip 118b and bare optical fibers 112 (e.g., during an overmolding process).

The technician also can position 332 the first enclosure member 210 over at least the intermediate strip 118b of the first cable segment 110. For example, the technician can slide the first enclosure member 210 over the intermediate strip 118b so that the optical fibers 112 (and surrounding jacket portion) extend through the interior 202 of the enclosure body 201. In some implementations, the diameter of the first enclosure member 210 is sufficiently small that the first enclosure member 210 can be slid easily within the enclosure sleeve 230.

Figure 12:
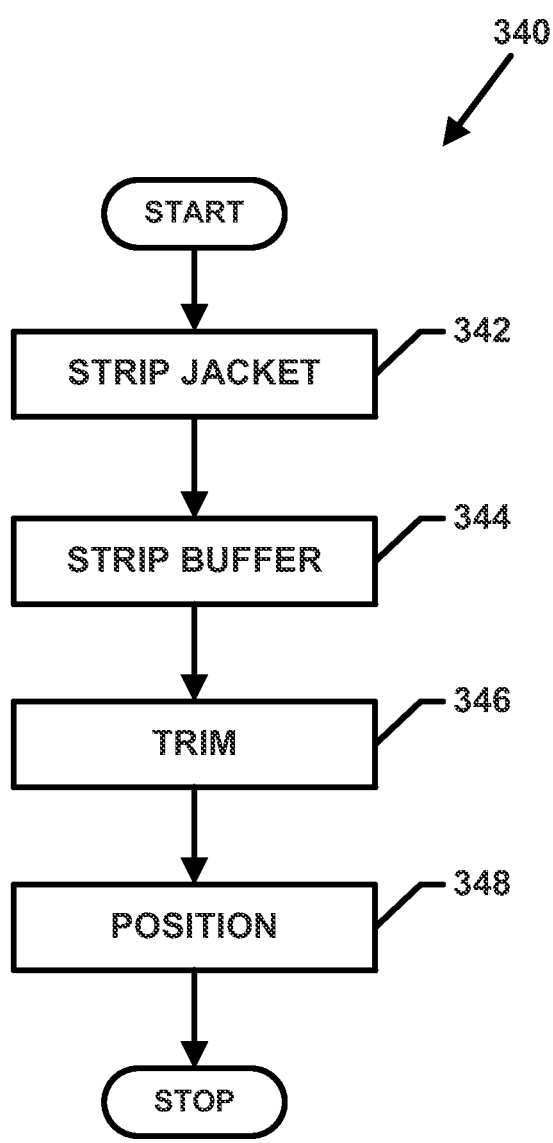
FIG. 12 provides one example second preparation process by which the technician can implement preparing the second cable segment for splicing.

FIG. 12 provides one example second preparation process 340 by which the technician can implement preparing 306 the second cable segment 120 for splicing. FIGS. 11 and 13 illustrate the steps of the second preparation process 340. In the example second preparation process 340, the technician removes 342 the outer jacket 128 of the second cable segment 120 to expose the buffer tube 124 and the strength components 127. The technician also strips 344 an end portion of the buffer tube 124 to expose the optical fibers 122. The technician trims 346 the strength components 127 to an appropriate length (see FIG. 13).

The technician positions 348 a second length of tubing 240 on the second cable segment 120. For example, the technician can slide the second length of tubing 240 over the optical fibers 122 of the second cable segment 120. In one implementation, the second length of tubing 240 has a diameter that is sufficiently small to enable the second length of tubing 240 to slide within the buffer tube 124. In another implementation, the second length of tubing 240 slides over the buffer tube 124.

Additional details regarding preparation of optical fiber cables for splicing and splicing techniques can be found in U.S. application Ser. No. 12/548,600, filed Aug. 27, 2009, titled "Splice of Fiber Optic Cables," now published as U.S. Publication No. 2010/0086266, the disclosure of which is hereby incorporated by reference herein in its entirety.

Figure 14:
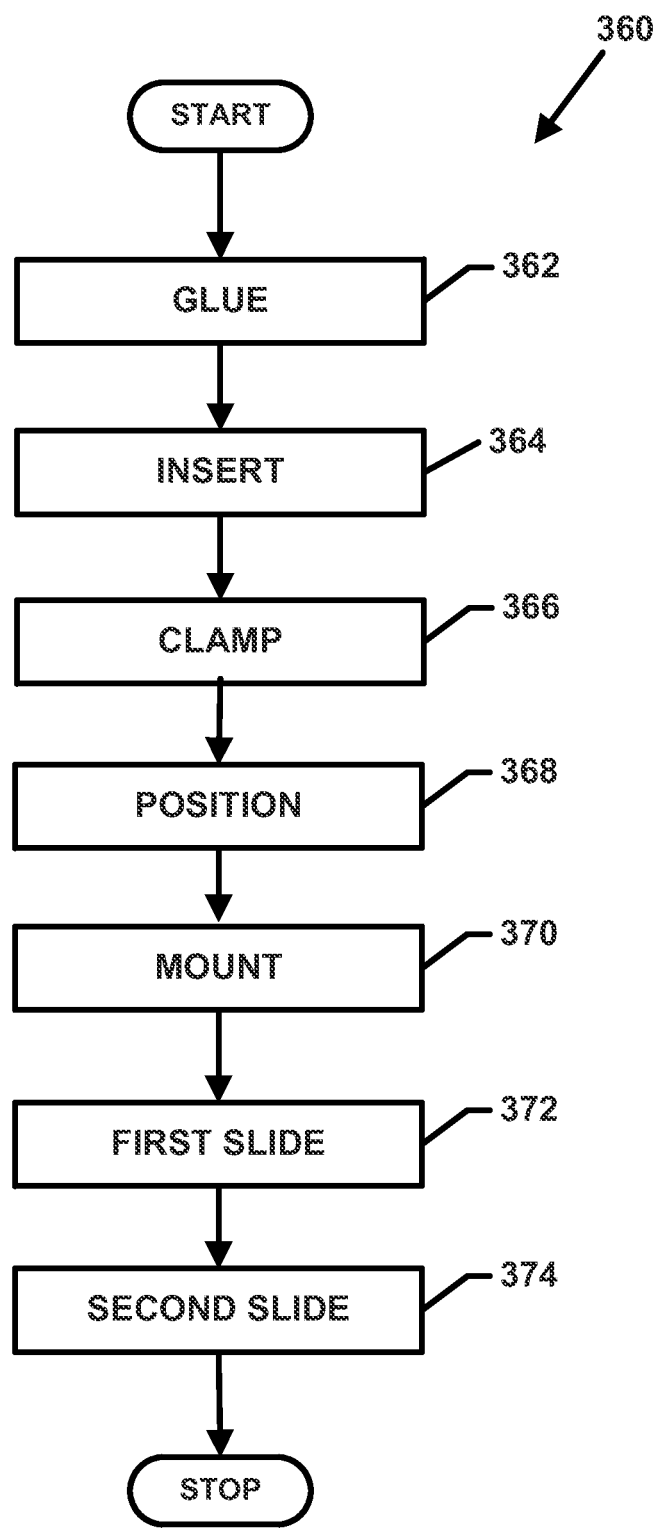
FIG. 14 provides one example mounting process by which the technician can implement securing the housing to the cable at the splice location.
Figure 17:
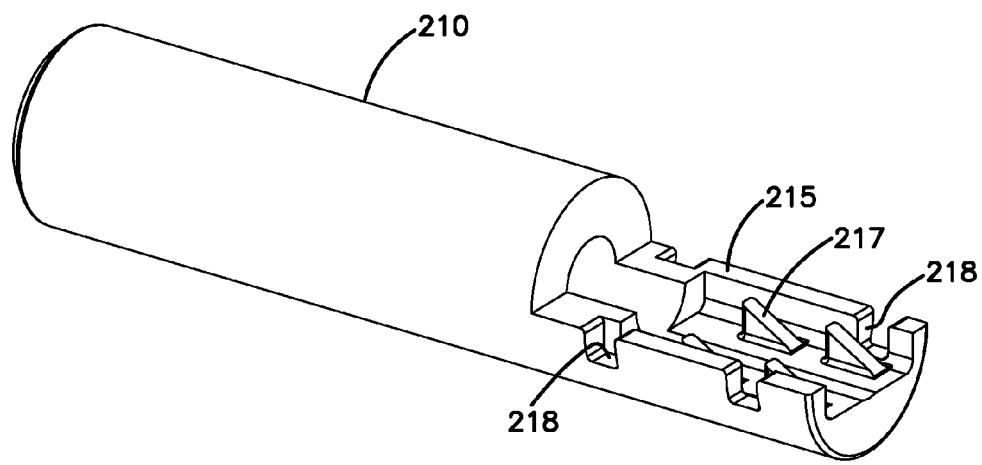
Figure 18:
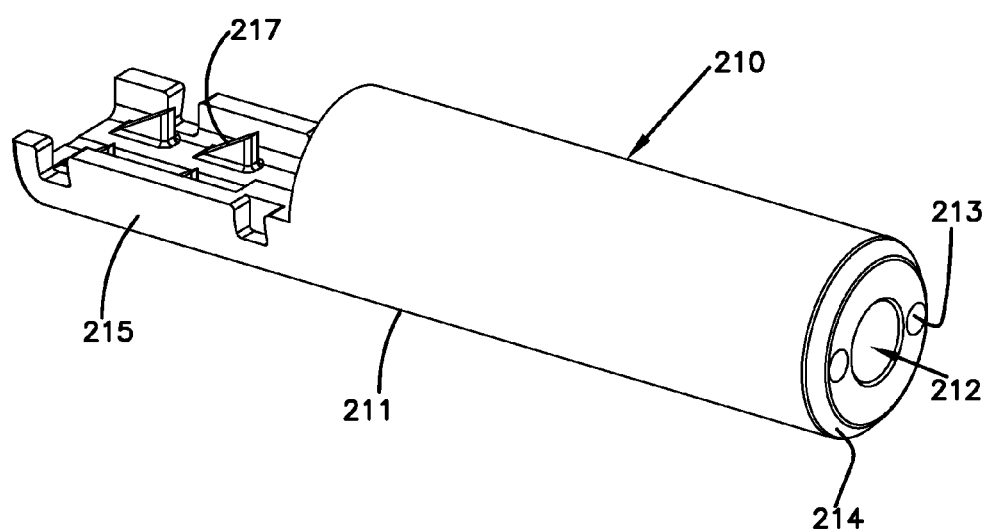
Figure 23:
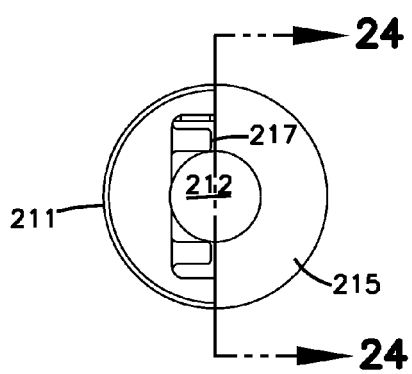
Figure 21:
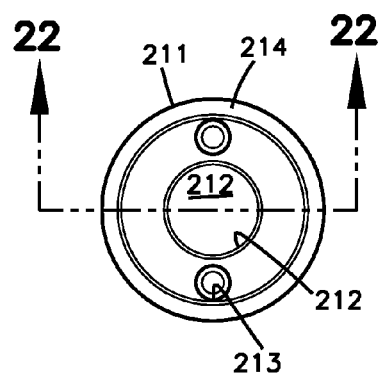
Figure 22:
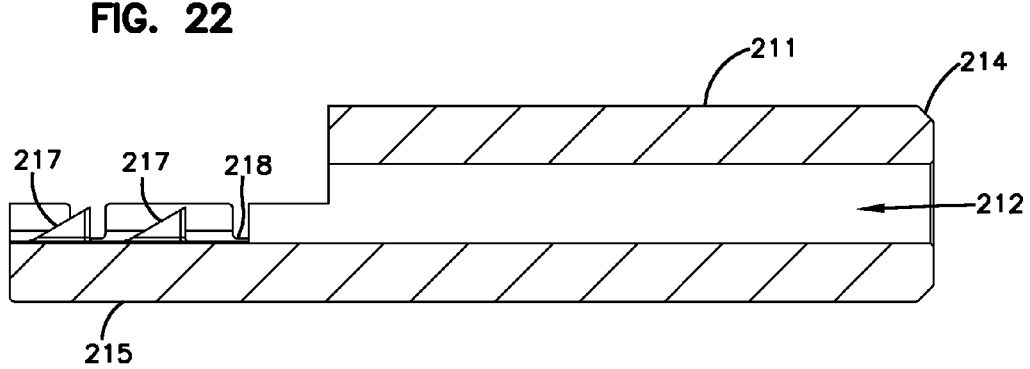

FIG. 14 provides one example mounting process 360 by which the technician can implement securing 310 the housing 200 to the cable 100 at the splice location. FIGS. 15 and 16 show the results of the steps of the mounting process 360. FIGS. 17-31 illustrate one example housing 200 suitable for use in implementing the steps of the example mounting process 360.

In general, in the mounting process 360, the technician attaches the strength members 117 of the first cable segment to the first end 203 of the enclosure arrangement 200 and attaches the strength components 127 of the second cable segment 120 to the second end 204 of the enclosure arrangement 200 (see FIG. 15). The technician then closes the enclosure arrangement 200 and prepares the splice location for sealing (see FIG. 16).

In some implementations, the first enclosure member 210 and the second enclosure member 220 form an attachment arrangement 205. In certain implementations, the attachment arrangement 205 can include at least one protruding member and at least one receiving cavity. For example, one of the enclosure members 210, 220 can include the protruding member and the other of the enclosure members 210, 220 can include a notch or cavity configured to receive the protruding member. In certain implementations, the first and second enclosures 210, 220 define multiple protruding members and cavities. In certain implementations, the protruding members and cavities can be friction-fit, snap-fit, latched, glued, or otherwise secured together.

FIGS. 17-24 show one example implementation of a first enclosure member 210. The first enclosure member 210 includes a generally cylindrical body 211 defining an axial through-passage 212 extending from a first end to a second end. The through-passage 212 is configured to receive the optical fibers 112, 122 of the cable segments 110, 120. At least a central portion of the through-passage 212 is sized to receive and enclose a splice sleeve 250 mounted over the spliced optical fibers 112, 122.

Figure 24:
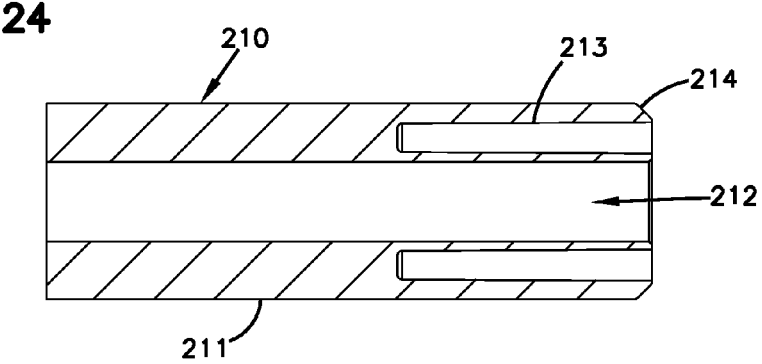
Figure 25:
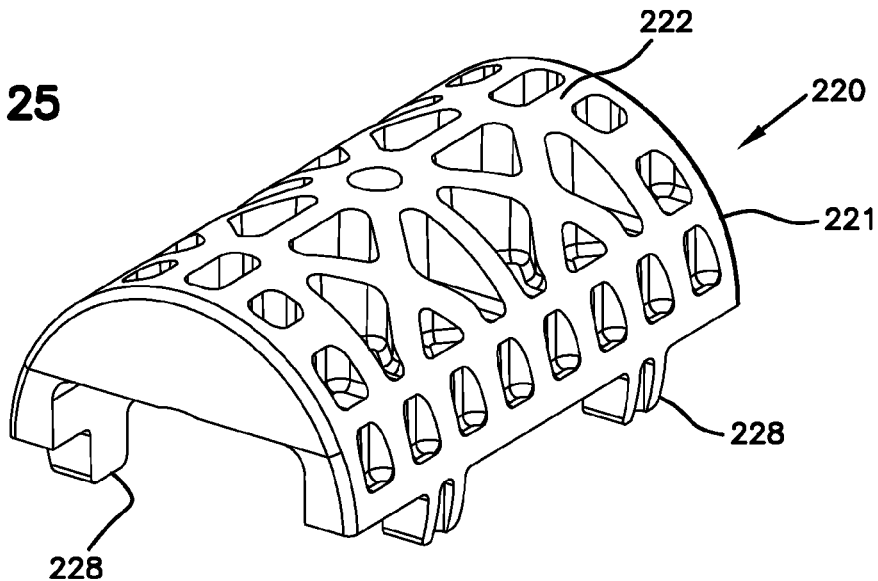
Figure 30:
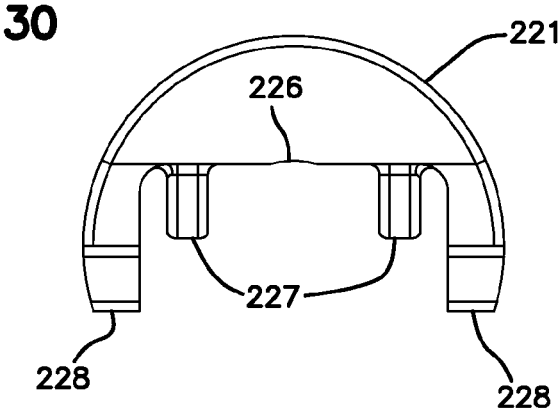
Figure 31:
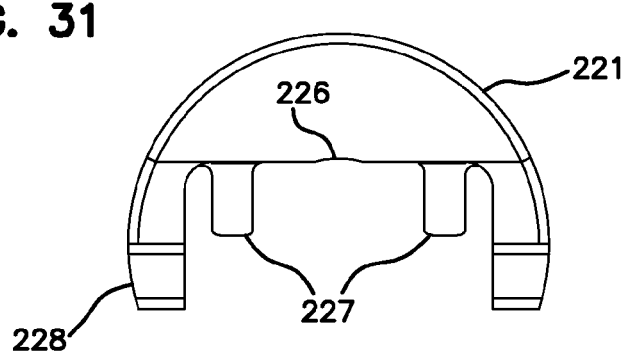

The enclosure body 211 includes at least one receiving passage 213 into which a strength component 127 of the second cable element 120 can be inserted (see FIG. 24). In some implementations, the receiving passage 213 extends only partially through the axial length of the enclosure body 211. For example, the receiving passage 213 can extend less than half the length of the enclosure body 211. In such implementations, the receiving passage 213 opens only at the second end of the body 211. In other implementations, the receiving passage 213 can extend the entire length of the body 211.

In some implementations, one end of the enclosure body 211 defines a single receiving passage 213. In other implementations, the enclosure body 211 defines multiple receiving passages 213. In the example shown, the enclosure body 211 defines a central through-passage 212 and two receiving passages 213 positioned on opposite sides of the through-passage 212. In certain implementations, the enclosure body 211 defines a tapered rim 214 at the end defining the receiving passages 213.

The first end of the body 211 of the first enclosure member 210 defines a mounting section 215 that is configured to receive the second enclosure member 220. For example, the mounting section 215 can define a portion of the outer cylindrical wall of the enclosure body 201. In some implementations, the mounting section 215 can define part of the attachment arrangement 205. For example, in one implementation, the mounting section 215 can define one or more notches 218 along a perimeter of the mounting section 215. In other implementations, the mounting section 215 can define fully enclosed openings into which protrusions can be received. In still other implementations, the mounting section 215 can include protruding sections.

In some implementations, the mounting section 215 defines a channel 216 along which the optical fibers 112 of the first cable segment 110 can be routed into the through-passage 212 (see FIG. 19). The mounting section 215 of the first enclosure member 210 also includes first grip members 217 that are configured to aid in retaining the strength members 117 of the first cable segment (see FIGS. 17 and 18). In some implementations, the grip members 217 define ramped surfaces to form teeth. In the example shown, the grip members 217 ramp upwardly as the grip members 217 extend toward the second end of the enclosure body 201.

In the example shown, the first grip members 217 are positioned into two axial rows on opposite sides of the fiber channel 216. In other implementations, the first grip members 217 can be arranged to otherwise align with the strength members 117 of the first cable segment 110. For example, the mounting section 215 can include a single axial row of grip members 217 to grip a single strength member 117 of first cable segments having only one strength member.

FIGS. 25-31 show one example implementation of a second enclosure member 220. The second enclosure member 220 includes a body 221 defining a cylindrical segment having a convex outer surface 222. The inner surface of the cylindrical segment 221 includes an engagement rim 223 defining at least a portion of the attachment arrangement 205. In the example shown, the engagement rim 223 defines protruding legs 228 that are sized and shaped to complement the notches 218 of the first enclosure member 210 (e.g., see FIG. 6). In other implementations, however, the engagement rim 223 can define notches or cavities to complement protrusions on the first enclosure member 210.

Figure 26:
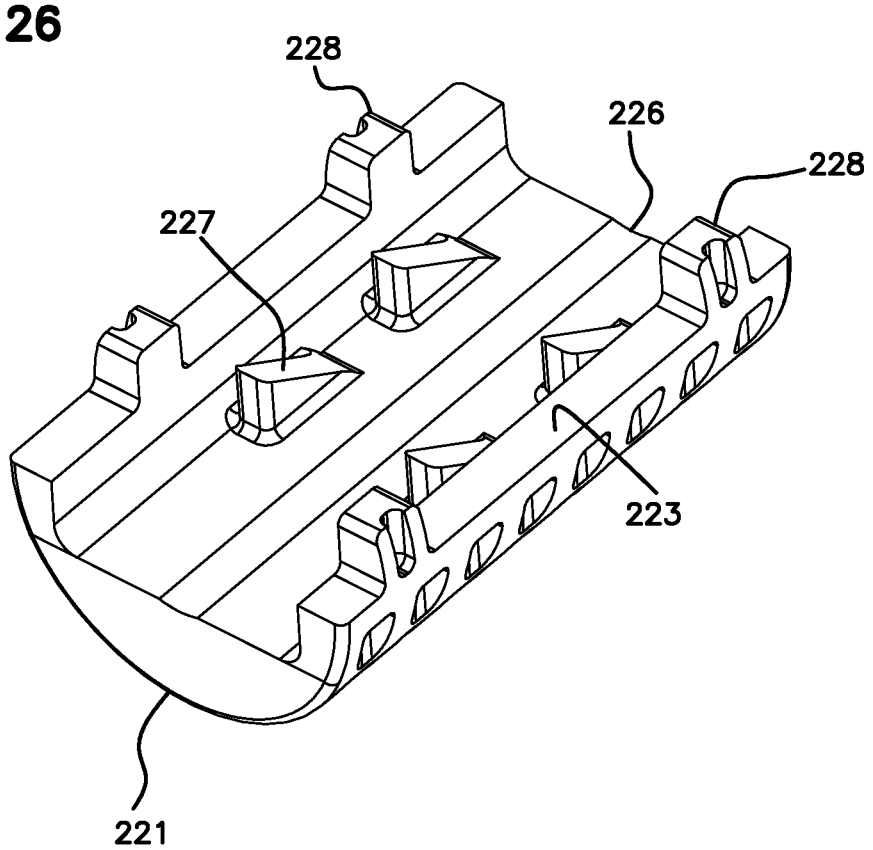
Figure 28:
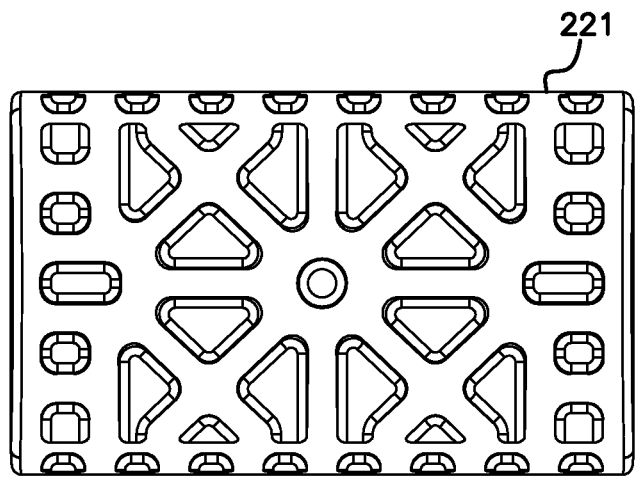
Figure 27:
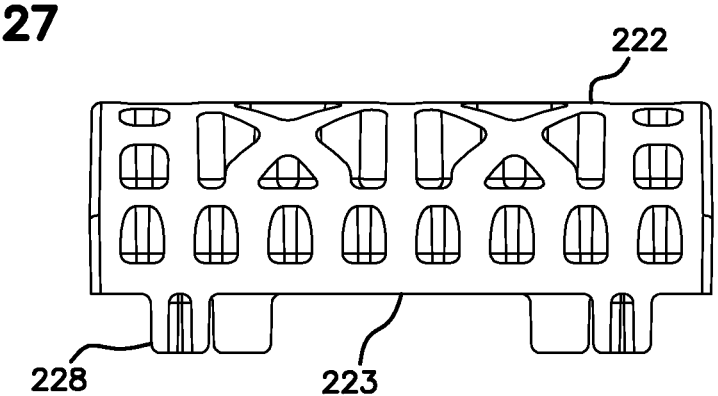
Figure 29:
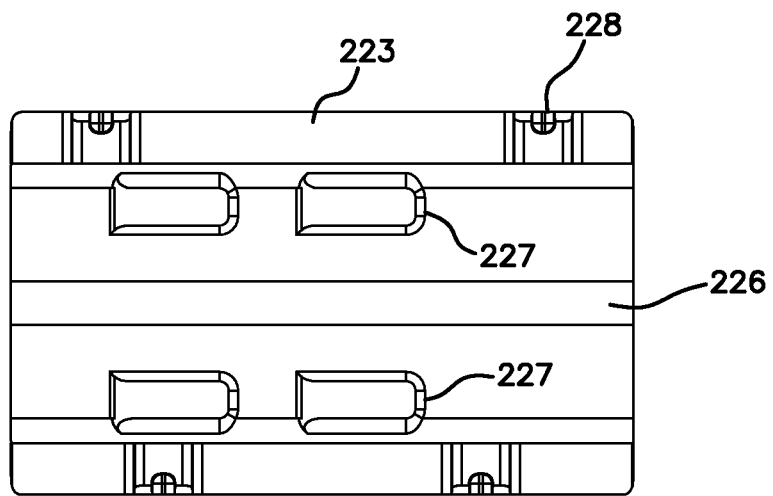

The inner side of the cylindrical segment 221 defines a channel 226 that forms part of the through-passage 202 when the first and second enclosure members 210, 220 are joined together (FIG. 26). The inner side of the cylindrical segment 221 also includes second grip members 227 that cooperate with the first grip members 217 of the first enclosure member 210 to retain the strength members 117 of the first cable segment (FIG. 26). In some implementations, the second grip members 227 define ramped surfaces to form teeth. In the example shown, the second grip members 227 ramp upwardly as the grip members 217 extend toward the second end of the enclosure body 201. The teeth of the first and second grip members 217, 227 intermesh when the second enclosure member 220 is mounted to the first enclosure member 210 (e.g., see FIG. 7). Each strength member 117 of the first cable segment 110 is clamped or retained between the first and second grip members 217, 227. For example, each strength member 117 of the first cable segment 110 may be clamped or retained between the intermeshed teeth of the first and second grip members 217, 227.

Referring back to FIG. 14, an example walk-through of the mounting process 360 using the example housing 200 described above will now be presented. The technician mounts the strength components 127 of the second cable segment 120 to the second end of the enclosure body 201 by applying adhesive 362 to the receiving passages 213 of the first enclosure member 210. The technician inserts the strength components 127 into the receiving passages 213 to adhere the strength components 127 to the first enclosure member 210. In certain implementations, the technician also applies adhesive to the strength components 127, themselves.

The technician mounts the strength members 117 of the first cable segment 110 to the first end of the enclosure body 201 by positioning 368 the strength members 117 along the first grip members 217 of the first enclosure member 210. In the example shown, the technician would position the outer cable strips 118a, 118c of the first cable segment 110 along the rows of grip members 217. In certain implementations, the strength members 117 are still enclosed within portions of the outer jacket 118 when the strength members 117 are mounted to the first enclosure member 210.

The technician mounts 370 the second enclosure member 220 to the first enclosure member to clamp the strength members 117 between the first and second grip members 217, 227. In the example shown, peaks of the first and second grip members 217, 227 are configured to dig into the top and bottom sides of the strength members 117 to inhibit pull out. Mounting the second enclosure member 220 to the first enclosure member 210 closes the mounting section 215 of the first enclosure member 210 to define the tubular enclosure body 201.

A technician slides 372 the enclosure sleeve 230 over the second enclosure member 220 and the mounting section 215 of the first enclosure member 210 to aid in retaining the second enclosure member 220 to the first enclosure member 210. In one implementation, the technician also crimps the enclosure sleeve 230 to the enclosure body 201. In other implementations, the enclosure sleeve 230 is held in place by friction or glue. In still other implementations, the enclosure sleeve 230 is held in place by an overmolded layer applied in the sealing step 312 of splicing process 300 of FIG. 8.

In some implementations, the enclosure sleeve 230 is initially slid over the first enclosure body 210 to the second end 204 of the enclosure body 201. In certain implementations, the enclosure sleeve 230 can even be slid past the enclosure body 201 to the optical fibers 122 of the second cable segment 120 prior to mounting the strength members 117 to the first enclosure member 210. After the strength members 117 are in position and the second enclosure member 220 has been fitted on the first enclosure member 210, the enclosure sleeve 230 can be slid back over the first enclosure body 211 to the appropriate position to hold the second enclosure member 220 to the first enclosure member 210.

The technician also positions 374 the tubing 240 over the exposed optical fibers 112, 122. For example, the technician can slide the tubing 240 toward the housing 200 to cover any bare optical fibers 112, 122. In one implementation, the technician positions one end of each length of tubing 240 inside the through-passage 202 of the enclosure body 201. In some implementations, the technician positions 374 the tubing 240 prior to securing the strength members 117 and/or strength components 127 to the enclosure body 201. In other implementations, the technician 374 positions the tubing 240 subsequent to securing the strength members 117 and/or strength components 127.

It should be appreciated that the operation illustrated in the example of FIG. 14 is provided for explanatory purposes and is not intended to represent a sole way of practicing the techniques of this disclosure. Rather, the techniques of this disclosure may be practiced in many ways. For example, the technician can secure the strength members 117 of the first cable segment 110 to the housing 200 before securing the strength components 127 of the second cable segment 120 to the housing 200. Alternatively, the technician can position the tubing 240 so that the tubing extends into the through-passage 202 of the enclosure body 201 prior to securing the enclosure body 201 to the strength members/components.

FIG. 15 shows the strength components 127 of the second cable segment 120 inserted into the receiving passages 213. The tubing 240 on the second cable segment 120 also has been slid into the through-passage 212 defined by the first enclosure member 210. The tubing 240 on the first cable segment 110 also has been positioned so that one end lays on the channel 216 defined in the mounting section 215 of the first enclosure member 210. The strength members 117 of the first cable segment 110 have not yet been positioned to engage the grip members 217 of the first enclosure member 210.

FIG. 16 shows the telecommunications cable 100 with the housing 200 mounted at the splice location prior to sealing the splice location. The strength members 117 of the first cable segment 110 extend between the grip members 217, 227 of the enclosure members 210, 220. The enclosure sleeve 230 is positioned over the second enclosure member 220 and the mounting section 215 of the first enclosure member 210. The tubing 240 is positioned to extend into the housing 200 and to cover any exposed optical fibers 112, 122.

From the forgoing detailed description, it will be evident that modifications and variations can be made in the methods of the disclosure without departing from the spirit or scope of the disclosure.

The invention claimed is:

1. An optical fiber cable comprising:
    a first cable segment including at least one optical fiber enclosed in a first jacket, the first cable segment also including at least one strength member, each strength member being sufficiently flexible to enable the strength member to be wrapped 360° around a ten millimeter diameter mandrel;
    a second cable segment including at least one optical fiber enclosed in a second jacket, the second cable segment also including at least one strength component having anti-buckling characteristics, the optical fiber of the second cable segment being spliced to the optical fiber of the first cable segment at a splice location;
    a splice enclosure coupled to the at least one strength member of the first cable segment and to the at least one strength component of the second cable segment, the splice enclosure mounted around the splice location; and
    an overmolded layer enclosing the splice enclosure.

2. The optical fiber cable as claimed in claim 1, wherein each strength member of the first cable segment includes a flat layer of reinforcing elements embedded within a binder.

3. The optical fiber cable as claimed in claim 1, wherein each strength component of the second cable segment includes glass filaments impregnated and bonded together with a resin.

4. The optical fiber cable as claimed in claim 1, wherein the at least one strength member of the first cable segment is coupled to the splice enclosure in a different manner than the at least one strength component of the second cable segment.

5. An optical fiber cable comprising:
    a first cable segment including at least one optical fiber enclosed in a first jacket, the first cable segment also including at least one strength member;
    a second cable segment including at least one optical fiber enclosed in a second jacket, the second cable segment also including at least one strength component that is less flexible than the at least one strength member of the first cable segment, the optical fiber of the second cable segment being spliced to the optical fiber of the first cable segment;
    a splice enclosure mounted over the spliced optical fibers of the first and second cable segments, the splice enclosure including a first enclosure member and a second enclosure member, the first enclosure member defining at least one receiving passage configured to receive the at least one strength component of the second cable segment, the first enclosure member and the second enclosure member cooperating to retain the at least one strength member of the first cable segment, wherein the first enclosure member and the second enclosure member cooperate to form an attachment arrangement including protrusions and notches.

6. The optical fiber cable as claimed in claim 5, wherein the first enclosure member includes the notches of the attachment arrangement and the second enclosure member includes the protrusions of the attachment arrangement.

7. The optical fiber cable as claimed in claim 5, further comprising an enclosure sleeve that is configured to mount over and surround the second enclosure member and a portion of the first enclosure member.

8. The optical fiber cable as claimed in claim 7, wherein the enclosure sleeve is crimped to the first and second enclosure members.

9. The optical fiber cable as claimed in claim 5, wherein the at least one strength component of the second cable segment is glued in the receiving passage of the first enclosure member.

10. The optical fiber cable as claimed in claim 5, further comprising a first length of tubing extending over at least a portion of the first cable segment and extending at least partially into a first end of the splice enclosure.

11. The optical fiber cable as claimed in claim 10, further comprising a second length of tubing extending over at least a portion of the second cable segment and extending at least partially into a second end of the splice enclosure.

12. An optical fiber cable comprising:
    a first cable segment including at least one optical fiber enclosed in a first jacket, the first cable segment also including at least one strength member;
    a second cable segment including at least one optical fiber enclosed in a second jacket, the second cable segment also including at least one strength component that is less flexible than the at least one strength member of the first cable segment, the optical fiber of the second cable segment being spliced to the optical fiber of the first cable segment;
    a splice enclosure mounted over the spliced optical fibers of the first and second cable segments, the splice enclosure including a first enclosure member and a second enclosure member, the first enclosure member defining at least one receiving passage configured to receive the at least one strength component of the second cable segment, the first enclosure member and the second enclosure member cooperating to retain the at least one strength member of the first cable segment, wherein the first enclosure member includes first grip members and the second enclosure member includes second grip members that cooperate with the first grip members to retain the at least one strength member of the first cable segment.

13. The optical fiber cable as claimed in claim 12, wherein the first and second grip members define ramped teeth.

14. An optical fiber cable comprising:
a first cable segment including at least one optical fiber enclosed in a first jacket, the first cable segment also including at least one strength member;
a second cable segment including at least one optical fiber enclosed in a second jacket, the second cable segment also including at least one strength component that is less flexible than the at least one strength member of the first cable segment, the optical fiber of the second cable segment being spliced to the optical fiber of the first cable segment;
a splice enclosure mounted over the spliced optical fibers of the first and second cable segments, the splice enclosure including a first enclosure member and a second enclosure member, the first enclosure member defining at least one receiving passage configured to receive the at least one strength component of the second cable segment, the first enclosure member and the second enclosure member cooperating to retain the at least one strength member of the first cable segment; and
an enclosure sleeve that is configured to mount over and surround the second enclosure member and a portion of the first enclosure member.

15. The optical fiber cable of claim 14, wherein the first enclosure member includes first grip members and the second enclosure member includes second grip members that cooperate with the first grip members to retain the at least one strength member of the first cable segment.

16. The optical fiber cable of claim 14, wherein the first enclosure member and the second enclosure member cooperate to form an attachment arrangement including protrusions and notches.

17. The optical fiber cable of claim 14, wherein the at least one strength component of the second cable segment is glued within the splice enclosure.

18. The optical fiber cable of claim 14, wherein the enclosure sleeve is crimped to the first and second enclosure members.

19. An optical fiber cable comprising:
a first cable segment including at least one optical fiber enclosed in a first jacket, the first cable segment also including at least one strength member;
a second cable segment including at least one optical fiber enclosed in a second jacket, the second cable segment also including at least one strength component that is less flexible than the at least one strength member of the first cable segment, the optical fiber of the second cable segment being spliced to the optical fiber of the first cable segment;
a splice enclosure mounted over the spliced optical fibers of the first and second cable segments, the splice enclosure including a first enclosure member and a second enclosure member, the first enclosure member defining at least one receiving passage configured to receive the at least one strength component of the second cable segment, the first enclosure member and the second enclosure member cooperating to retain the at least one strength member of the first cable segment; and
a first length of tubing extending over at least a portion of the first cable segment and extending at least partially into a first end of the splice enclosure.

20. The optical fiber cable as claimed in claim 19, further comprising a second length of tubing extending over at least a portion of the second cable segment and extending at least partially into a second end of the splice enclosure.

* * * * *